US012585063B2

(12) United States Patent
Scofield

(10) Patent No.: US 12,585,063 B2
(45) Date of Patent: Mar. 24, 2026

(54) WAVEGUIDE STRUCTURE

(71) Applicant: ROCKLEY PHOTONICS LIMITED, Altrincham (GB)

(72) Inventor: Adam Scofield, Los Angeles, CA (US)

(73) Assignee: Rockley Photonics Limited, Altrincham (GB)

( * ) Notice: Subject to any disclaimer, the term of this patent is extended or adjusted under 35 U.S.C. 154(b) by 472 days.

(21) Appl. No.: 18/022,973

(22) PCT Filed: Aug. 27, 2021

(86) PCT No.: PCT/EP2021/073795
§ 371 (c)(1),
(2) Date: Feb. 23, 2023

(87) PCT Pub. No.: WO2022/043525
PCT Pub. Date: Mar. 3, 2022

(65) Prior Publication Data
US 2023/0314707 A1 Oct. 5, 2023

Related U.S. Application Data

(60) Provisional application No. 63/071,177, filed on Aug. 27, 2020.

(51) Int. Cl.
*G02B 6/122* (2006.01)
*G02B 6/12* (2006.01)

(52) U.S. Cl.
CPC ......... *G02B 6/1223* (2013.01); *G02B 6/1228* (2013.01); *G02B 2006/12061* (2013.01)

(58) Field of Classification Search
CPC .... G02B 6/105; G02B 6/12011; G02B 6/122; G02B 6/1228; G02B 6/125
See application file for complete search history.

(56) References Cited

U.S. PATENT DOCUMENTS 10,429,582 B1 * 10/2019 Bian .................. G02B 6/12002
10,436,982 B1 10/2019 Bian et al.
(Continued)

FOREIGN PATENT DOCUMENTS

EP 3091379 A1 11/2016
EP 3153899 A1 * 4/2017 ........... G02B 6/1228

OTHER PUBLICATIONS

International Search Report and Written Opinion of the International Searching Authority, mailed Dec. 20, 2021, corresponding to PCT/EP2021/073795, 12 pages.
(Continued)

*Primary Examiner* — Eric Wong
(74) *Attorney, Agent, or Firm* — Womble Bond Dickinson (US) LLP

(57) ABSTRACT

A waveguide structure. In some embodiments, the waveguide structure, includes: a first waveguide (105), a second waveguide (120), and a third waveguide (125) on a substrate (115). The first waveguide (105) may be at a different height than the second waveguide (120). The waveguides may be configured to cause light to couple between the first waveguide (105) and the second waveguide (120), and between the second waveguide (120) and the third waveguide (125). The first, second, and third waveguides (105, 120, 125) may be composed of respective materials having a first index of refraction, a second index of refraction, and a third index of refraction respectively. The third material may include silicon and nitrogen. The second index of refraction may be greater than the first index of refraction, and less than the third index of refraction.

13 Claims, 23 Drawing Sheets

(56)                    References Cited

U.S. PATENT DOCUMENTS

2012/0230635  A1 *    9/2012   Yoshida ................. G02B 6/125
                                                                            385/43
2014/0294341  A1 *   10/2014   Hatori .................. G02B 6/1228
                                                                            385/14
2016/0131837  A1       5/2016   Mahgerefteh et al.
2017/0179679  A1 *    6/2017   Lee ....................... H01S 5/2223
2023/0093438  A1 *    3/2023   Duong ................... G02B 6/124
                                                                            385/14

OTHER PUBLICATIONS

European Patent Office Communication pursuant to Article 94(3)
EPC, for Patent Application No. 21 772 705.6, mailed Dec. 6, 2024,
6 pages.
International Search Report for PCT/EP2021/073795 dated Dec. 20,
2021, 4 pages.

* cited by examiner

105

110

115

Si

SiO₂

Si

Si

3C

3C

SiO₂

Deposit thick SiO2 layer

WAVEGUIDE STRUCTURE

CROSS-REFERENCE TO RELATED APPLICATION(S)

The present application is a U.S. National Phase Patent Application of International Application No. PCT/EP2021/073795, filed on Aug. 27, 2021, which claims priority to and the benefit of U.S. Provisional Application No. 63/071,177, filed Aug. 27, 2020, entitled "WAVEGUIDE STRUC-TURE", the entire content of each of which is incorporated herein by reference.

FIELD

One or more aspects of embodiments according to the present disclosure relate to waveguides, and more particularly to an optical waveguide structure including several waveguides with different indices of refraction.

BACKGROUND

Integration of silicon nitride waveguides with a 3 um Si waveguide platform may be challenging due the strain and hardness of silicon nitride. Related art approaches (in-plane coupling) may be primarily suitable for integration with a 1 um Si waveguide platform because of the limit on silicon nitride thickness due to strain.

Thus, there is a need for an improved waveguide struc-ture.

SUMMARY

According to an embodiment of the present invention, there is provided a waveguide structure, including: a first waveguide on a substrate; a second waveguide on the substrate; and a third waveguide on the substrate, the first waveguide, the second waveguide, and the third waveguide each being substantially parallel to the substrate, the first waveguide being at a different height than the second waveguide, the first waveguide and the second waveguide being configured to cause light to couple between the first waveguide and the second waveguide, the second wave-guide and the third waveguide being configured to cause light to couple between the second waveguide and the third waveguide, the first waveguide being composed of a first material having a first index of refraction, the second wave-guide being composed of a second material having a second index of refraction, the third waveguide being composed of a third material having a third index of refraction, the third material including silicon and nitrogen, and the second index of refraction being greater than the first index of refraction, and less than the third index of refraction.

In some embodiments, the first waveguide is composed of crystalline silicon.

In some embodiments, the first waveguide is a waveguide in a crystalline silicon layer on a buried oxide layer, the crystalline silicon layer having a thickness of more than 1 micron.

In some embodiments, the first waveguide overlaps the second waveguide in a region of overlap.

In some embodiments, the second waveguide has a first taper and a second taper, the second waveguide having a width increasing along a first longitudinal direction within the first taper and decreasing along the first longitudinal direction within the second taper.

In some embodiments, a portion of the first taper is in the region of overlap.

In some embodiments, the second waveguide is com-posed of amorphous silicon.

In some embodiments, the third material is silicon nitride.

In some embodiments, the third waveguide is at a differ-ent height than the first waveguide.

In some embodiments, the third waveguide is at a differ-ent height than the second waveguide.

In some embodiments, the waveguide structure includes a first intervening layer, between the first waveguide and the second waveguide, the first intervening layer being com-posed of a fourth material, having a fourth index of refrac-tion.

In some embodiments, the waveguide structure further includes a fourth waveguide on the substrate, wherein: the fourth waveguide is composed of a fifth material having a fifth index of refraction, and the third waveguide and the fourth waveguide are configured to cause light to couple between the third waveguide and the fourth waveguide.

In some embodiments, the fourth waveguide is at a different height than the third waveguide.

In some embodiments, the fourth waveguide overlaps the third waveguide.

In some embodiments: the first material is silicon, the second material is amorphous silicon, the third material is silicon nitride with an atomic ratio, of silicon to nitrogen, of at least 1.5, the fourth material is silicon nitride, with an atomic ratio, of silicon to nitrogen, between 0.6 and 1.5.

In some embodiments, the waveguide structure further includes: a second intervening layer, between the first wave-guide and the second waveguide, the second intervening layer being composed of a sixth material, having a sixth index of refraction.

In some embodiments, the sixth material is the same as the fourth material.

In some embodiments: the fifth index of refraction is greater than the second index of refraction, the third index of refraction is within 50% of the average of the second index of refraction and the fifth index of refraction, and the fourth index of refraction is lower than the second index of refraction and lower than the fifth index of refraction.

In some embodiments: the second waveguide is at a greater height than the first waveguide, the third waveguide is at a greater height than the second waveguide, and the fourth waveguide is at a greater height than the third waveguide.

BRIEF DESCRIPTION OF THE DRAWINGS

These and other features and advantages of the present disclosure will be appreciated and understood with reference to the specification, claims, and appended drawings wherein:

DETAILED DESCRIPTION

The detailed description set forth below in connection with the appended drawings is intended as a description of exemplary embodiments of a waveguide structure provided in accordance with the present disclosure and is not intended to represent the only forms in which the present disclosure may be constructed or utilized. The description sets forth the features of the present disclosure in connection with the illustrated embodiments. It is to be understood, however, that the same or equivalent functions and structures may be accomplished by different embodiments that are also intended to be encompassed within the scope of the disclosure. As denoted elsewhere herein, like element numbers are intended to indicate like elements or features.

Figure 1:
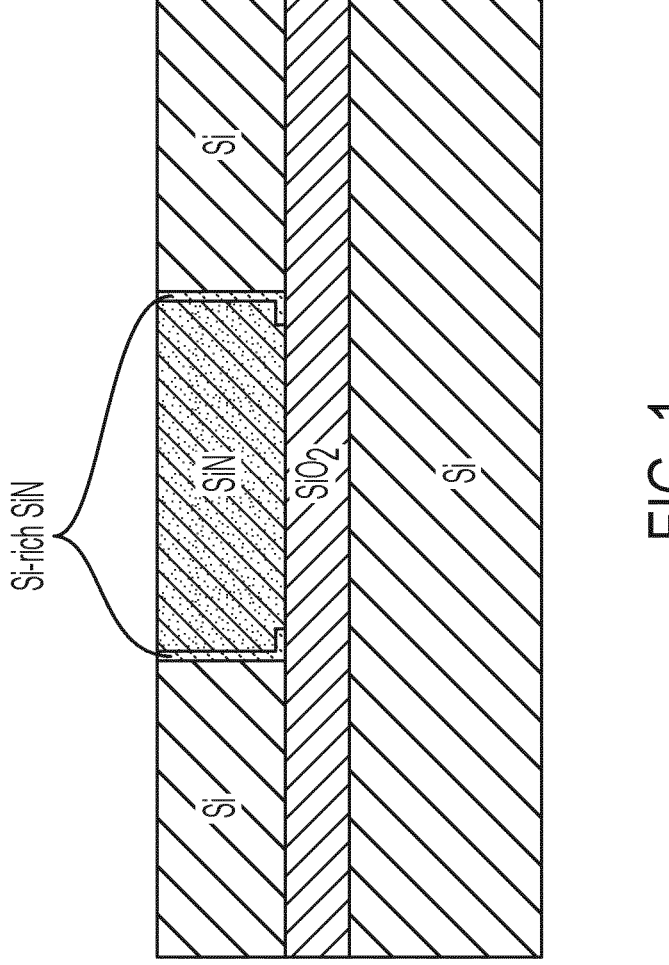
FIG. 1 is a cross-sectional view of a waveguide structure.

FIG. 1 shows a related art waveguide structure, in which a waveguide segment composed of silicon nitride is formed between two waveguide segments each of which is composed of crystalline silicon. Layers of silicon-rich silicon nitride may be present between the waveguide segment composed of silicon nitride and the waveguide segments composed of crystalline silicon, as shown.

In some embodiments a vertically offset amorphous silicon waveguide, or "escalator" is used to integrate one or more silicon nitride waveguides with a 3 um crystalline silicon waveguide in the device layer of a silicon on insulator (SOI) wafer. To fabricate such a waveguide structure, the silicon device layer may first be patterned with waveguides. After waveguide patterning, the trenches forming the waveguide cladding in the lateral direction, and one or more cavities forming gaps in the waveguides, are planarized by conformal coating with silicon dioxide ("SiO2", or "SiO2", or simply "oxide") and chemical-mechanical polishing. A thin layer of SiO2 is uniformly deposited across the surface as an adhesion layer for amorphous silicon. An amorphous silicon layer is then deposited and patterned to form a double-taper intermediate waveguide structure (which may be referred to as a "second waveguide" in the description below), a first taper of which is above the silicon waveguide, and a second taper of which is above the planarized SiO2 layer. Silicon nitride film is then deposited over the entire surface and etched to form one or more waveguides (e.g., a "third waveguide" in the description below). The silicon nitride film may optionally be polished to planarize for higher levels of integration or to improve coupling performance.

Figures 2A, 2B:
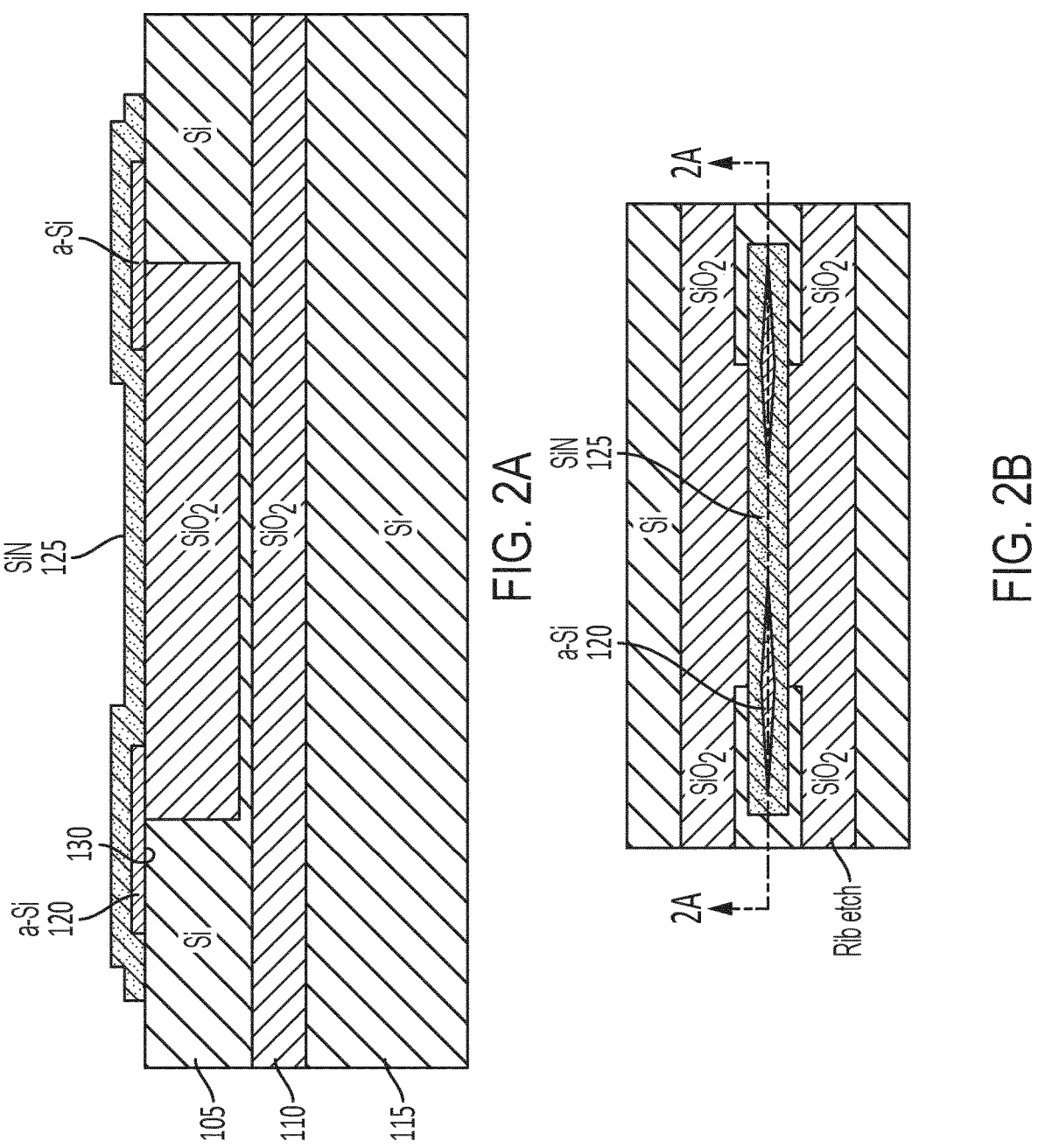
FIG. 2A is cross-sectional view of a waveguide structure, according to an embodiment of the present disclosure.
FIG. 2B is a top view of a waveguide structure, according to an embodiment of the present disclosure.

FIGS. 2A and 2B show, for some embodiments, a cross-sectional view (taken along section line 2A-2A in FIG. 2B), and a top view, respectively, of such a structure formed on a silicon on insulator (SOI) wafer. On the left-hand side of FIG. 2A, a first waveguide 105 composed of crystalline silicon is formed in the device layer of the silicon on insulator (SOI) wafer, which also includes a buried oxide (BOX) layer 110, and a crystalline silicon substrate 115. A second waveguide 120 composed of amorphous silicon is formed on (i) the first waveguide 105 and on (ii) a top surface of a layer of silicon dioxide that fills a cavity in the device layer. A strip of silicon nitride forms a third waveguide 125. An intervening layer 130, composed of silicon dioxide (which may be thin, and which is illustrated only as a single line in FIG. 2A), may be present between the first waveguide 105 and the second waveguide 120 (and between the third waveguide 125 and the first waveguide 105, in regions in which the third waveguide 125 overlaps the first waveguide 105). The intervening layer 130 may act as an adhesion layer and may also affect the coupling of light between the first waveguide 105 and the second waveguide 120.

The amorphous silicon of the second waveguide 120 may have a higher index of refraction than the crystalline silicon of the first waveguide 105, and, as such, the first waveguide 105 and the second waveguide 120 may be configured to cause light to couple between the first waveguide and the second waveguide 120 with (e.g., for light propagating from left to right within the left half of FIG. 2A), the second waveguide 120 being able, because of its higher index of refraction, to "pull" the optical mode out of the first waveguide 105. The third waveguide 125 may have a lower index of refraction than the second waveguide 120; in the coupling region between the second waveguide 120 and the third waveguide 125, light may be caused to couple between the second waveguide 120 and the third waveguide 125. For example, for light propagating from left to right within the left half of FIG. 2A, the light may be pushed out of the second waveguide 120 by the taper of the second waveguide, and, because the first waveguide 105 is absent from the coupling region between the second waveguide 120 and the third waveguide 125, the light does not couple back into the first waveguide. In some embodiments, the second waveguide 120, instead of being composed of amorphous silicon, is composed of a different material (e.g., silicon germanium (SiGe)) having a higher index of refraction than the crystalline silicon of the first waveguide 105.

Figures 3A, 3B:
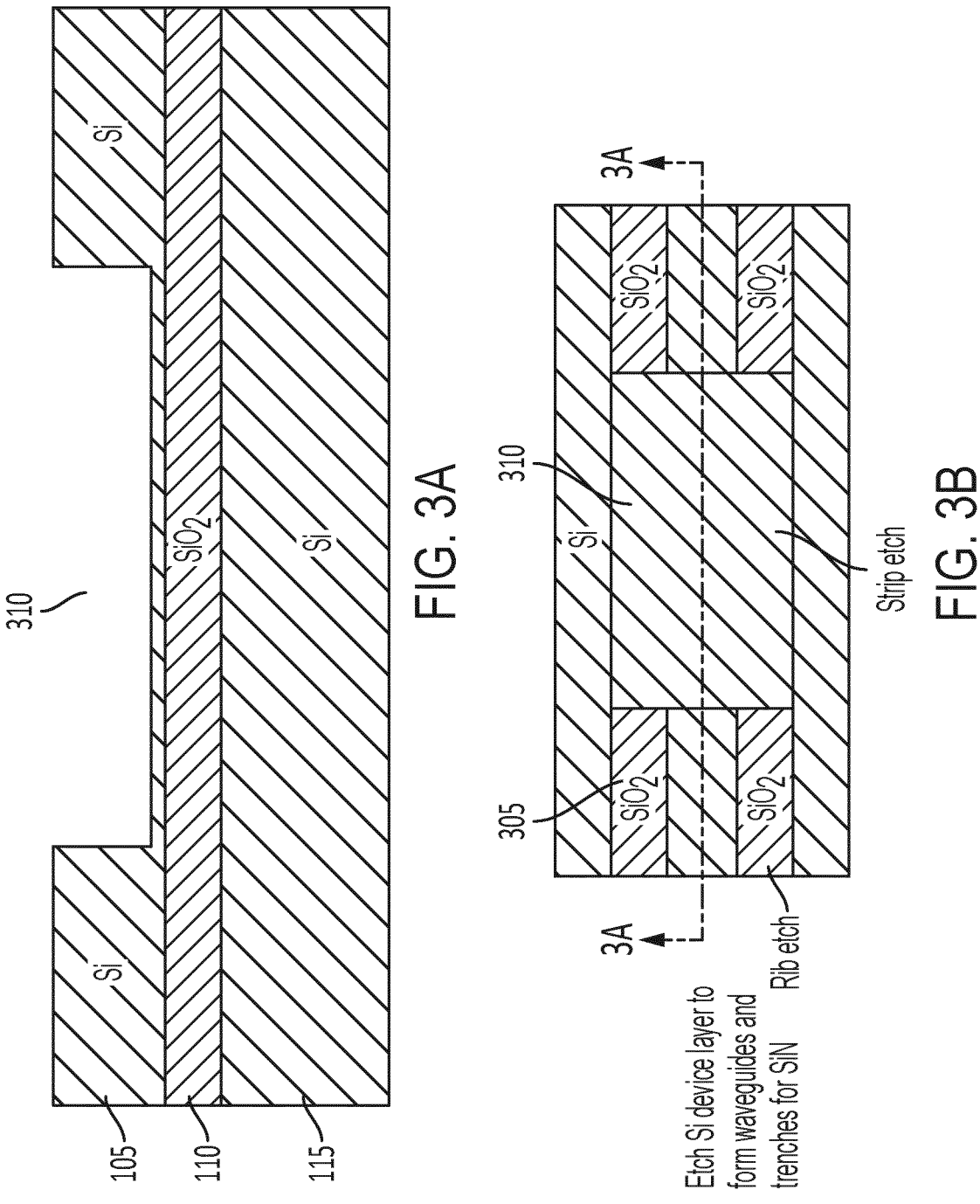
FIG. 3A is cross-sectional view of an intermediate prod-uct, according to an embodiment of the present disclosure.
FIG. 3B is a top view of an intermediate product, accord-ing to an embodiment of the present disclosure.
Figures 3C, 3D:
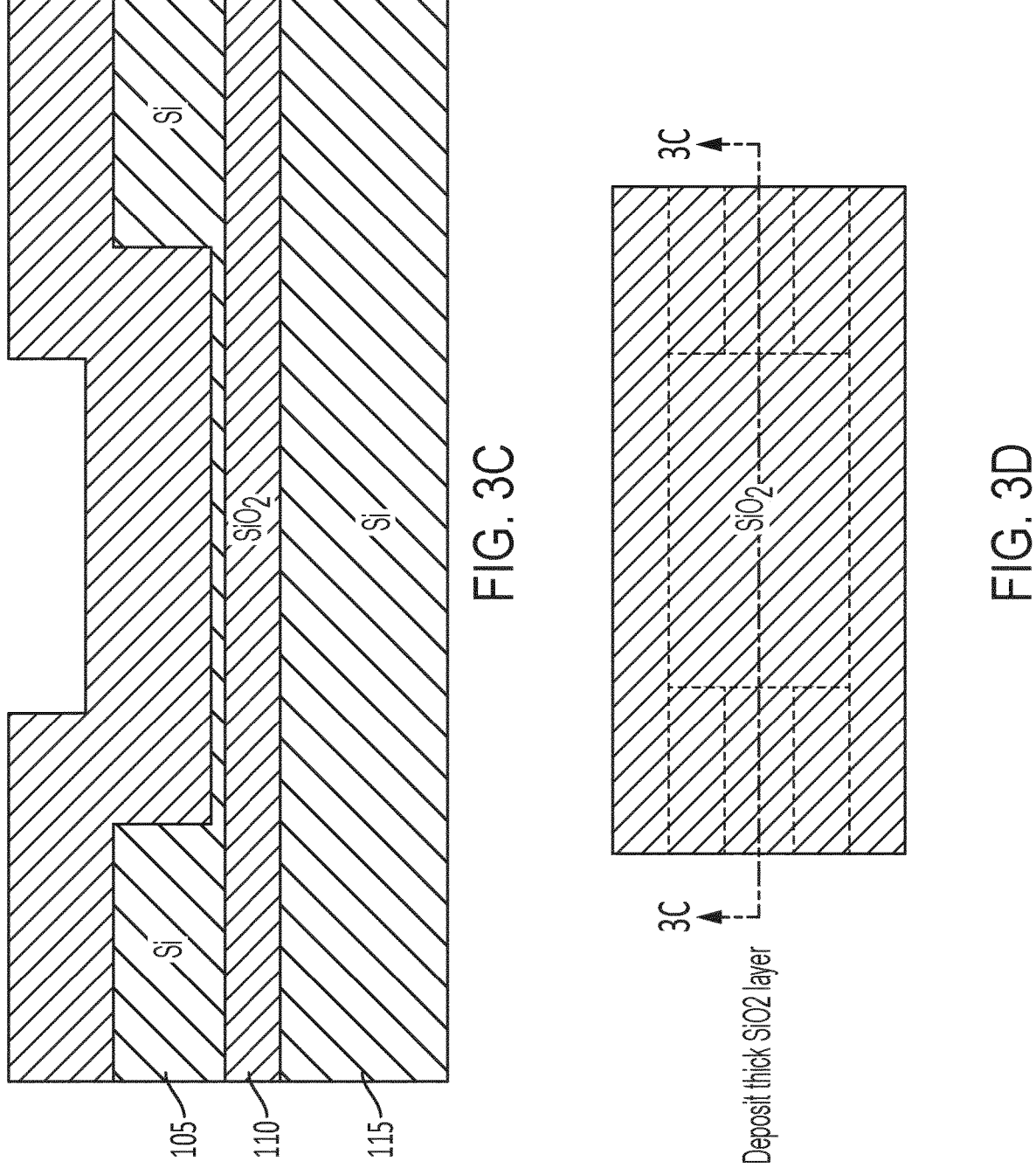
FIG. 3C is cross-sectional view of an intermediate prod-uct, according to an embodiment of the present disclosure.
FIG. 3D is a top view of an intermediate product, accord-ing to an embodiment of the present disclosure.
Figures 3E, 3F:
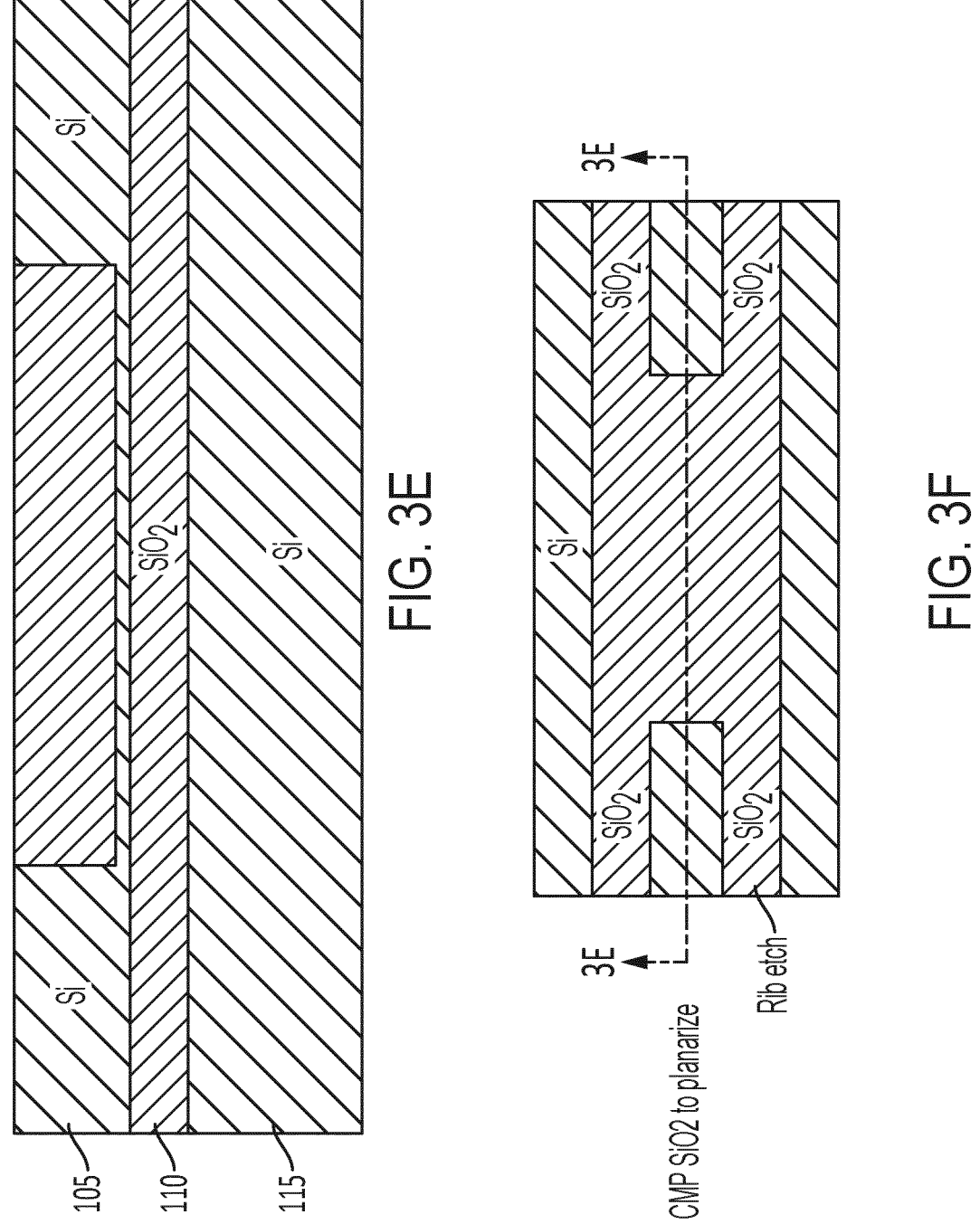
FIG. 3E is cross-sectional view of an intermediate product, according to an embodiment of the present disclosure.
FIG. 3F is a top view of an intermediate product, according to an embodiment of the present disclosure.
Figures 3G, 3H:
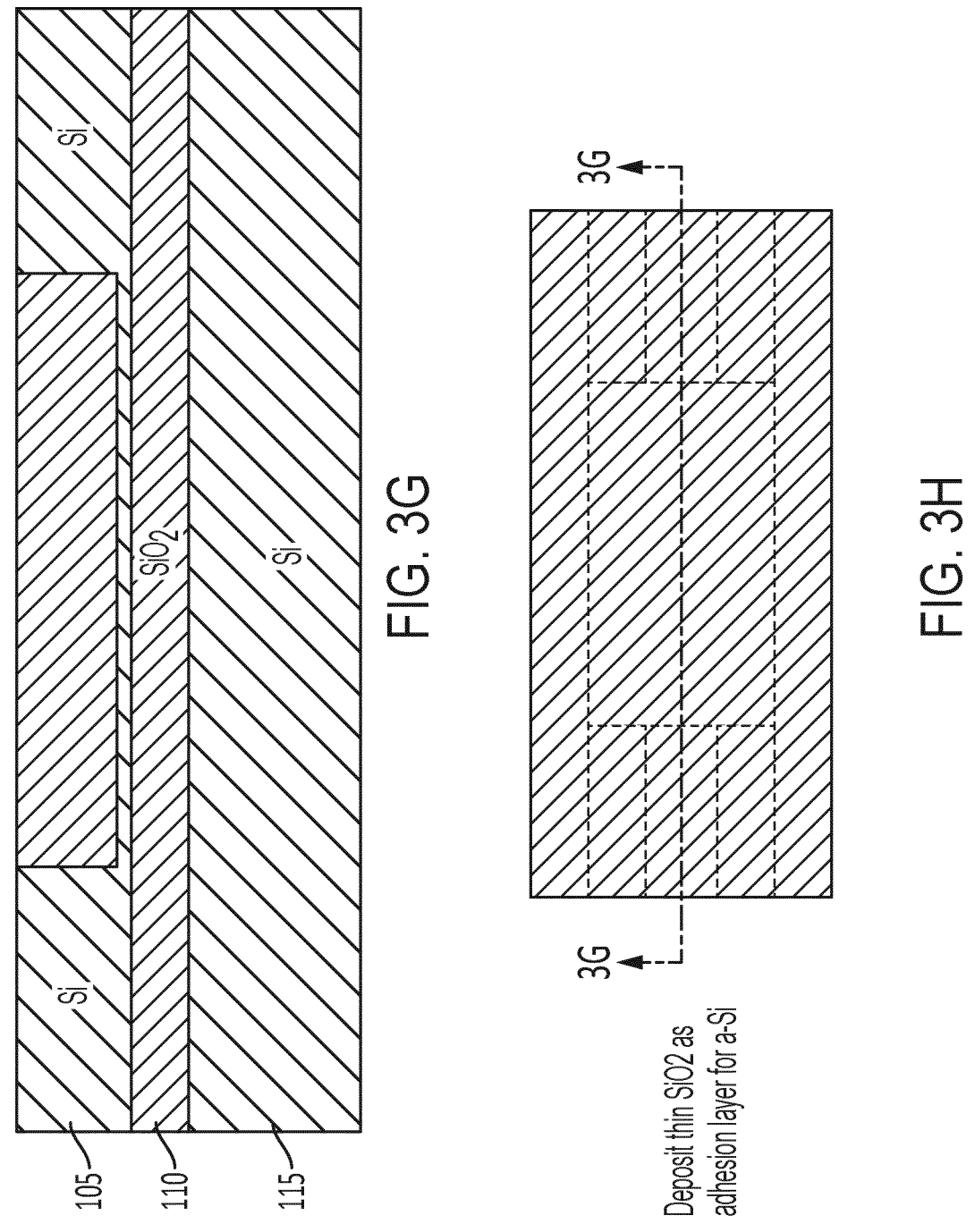
FIG. 3G is cross-sectional view of an intermediate product, according to an embodiment of the present disclosure.
FIG. 3H is a top view of an intermediate product, according to an embodiment of the present disclosure.
Figures 3I, 3J:
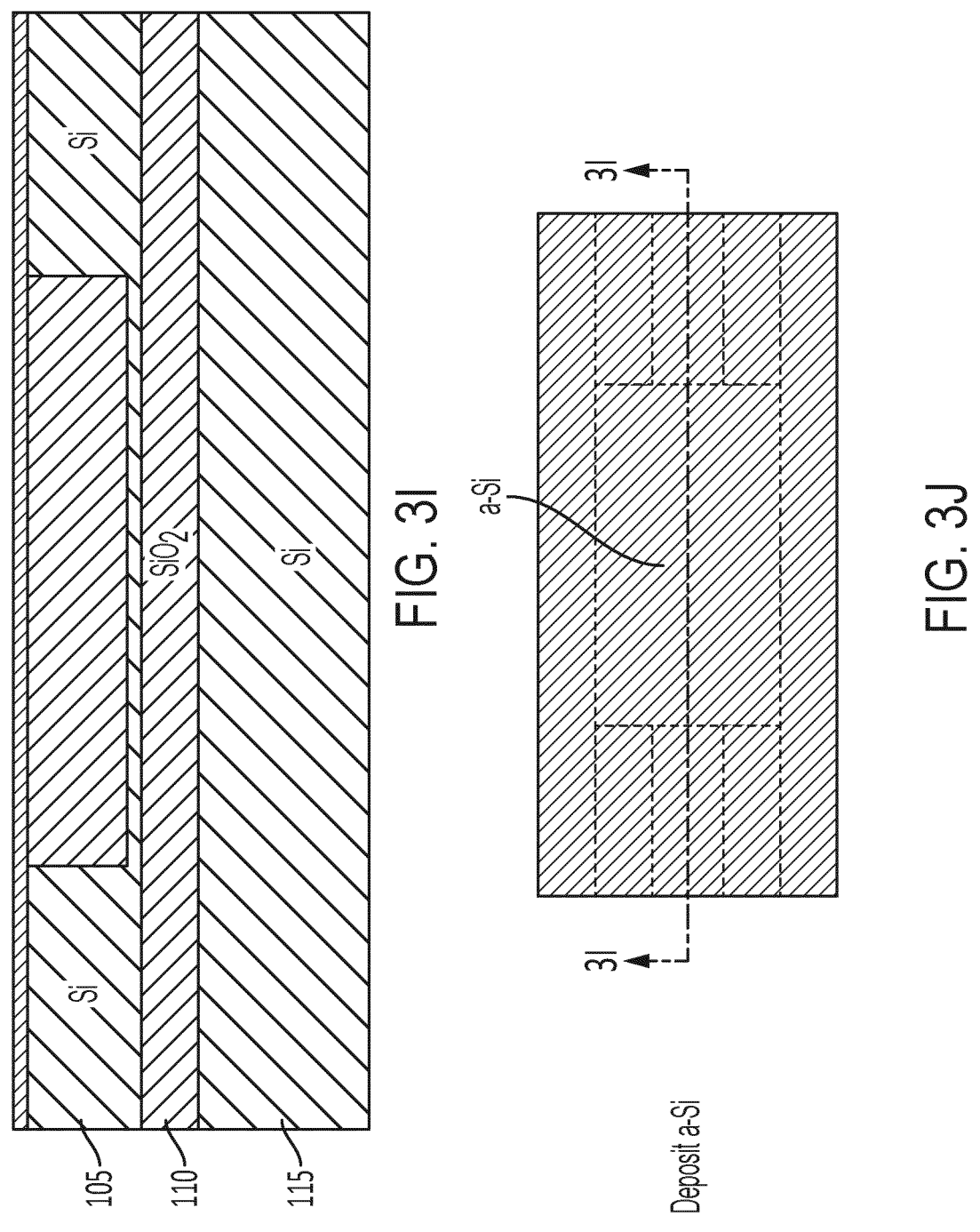
FIG. 3I is cross-sectional view of an intermediate product, according to an embodiment of the present disclosure.
FIG. 3J is a top view of an intermediate product, according to an embodiment of the present disclosure.
Figures 3K, 3L:
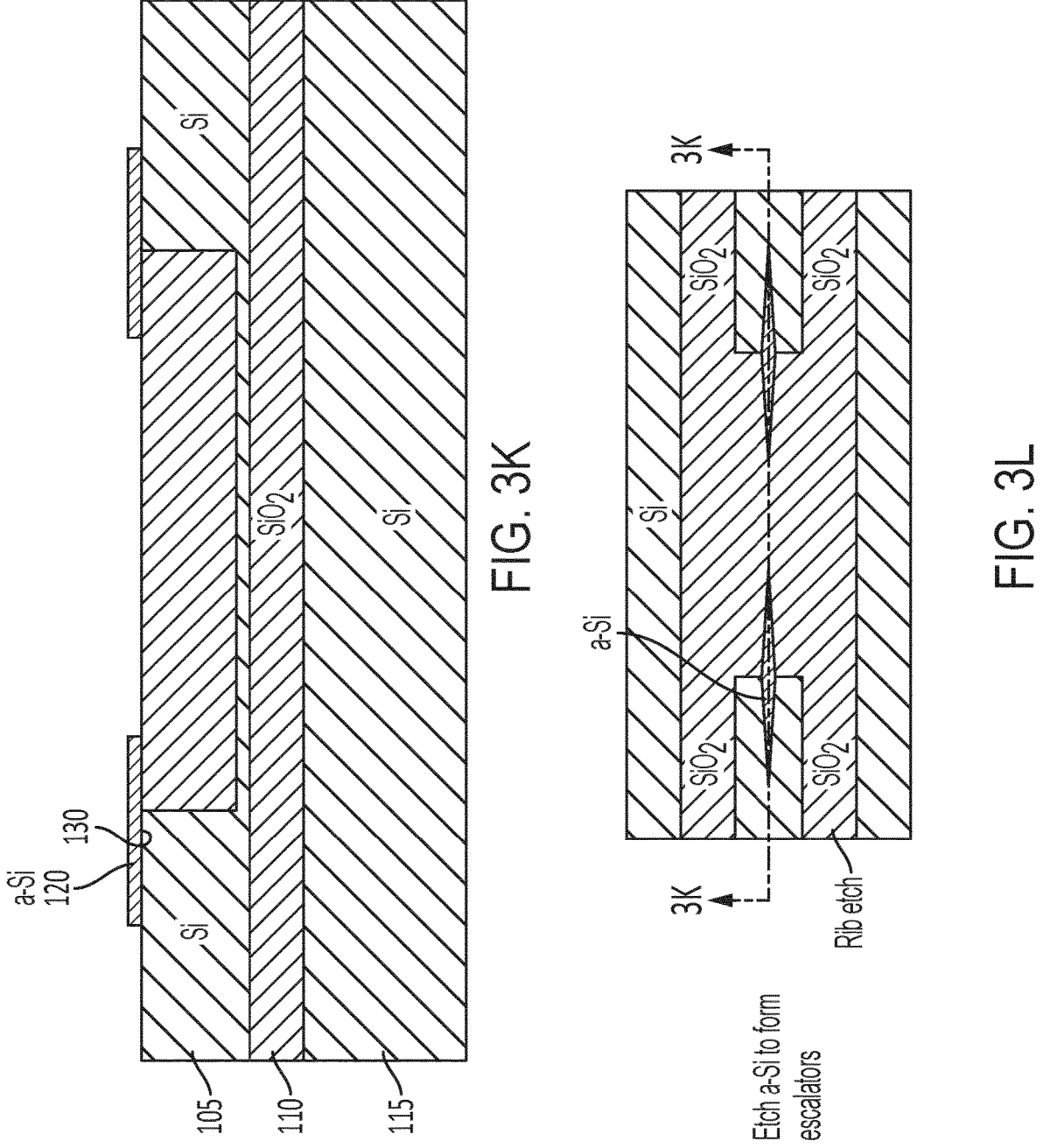
FIG. 3K is cross-sectional view of an intermediate product, according to an embodiment of the present disclosure.
FIG. 3L is a top view of an intermediate product, according to an embodiment of the present disclosure.
Figures 3M, 3N:
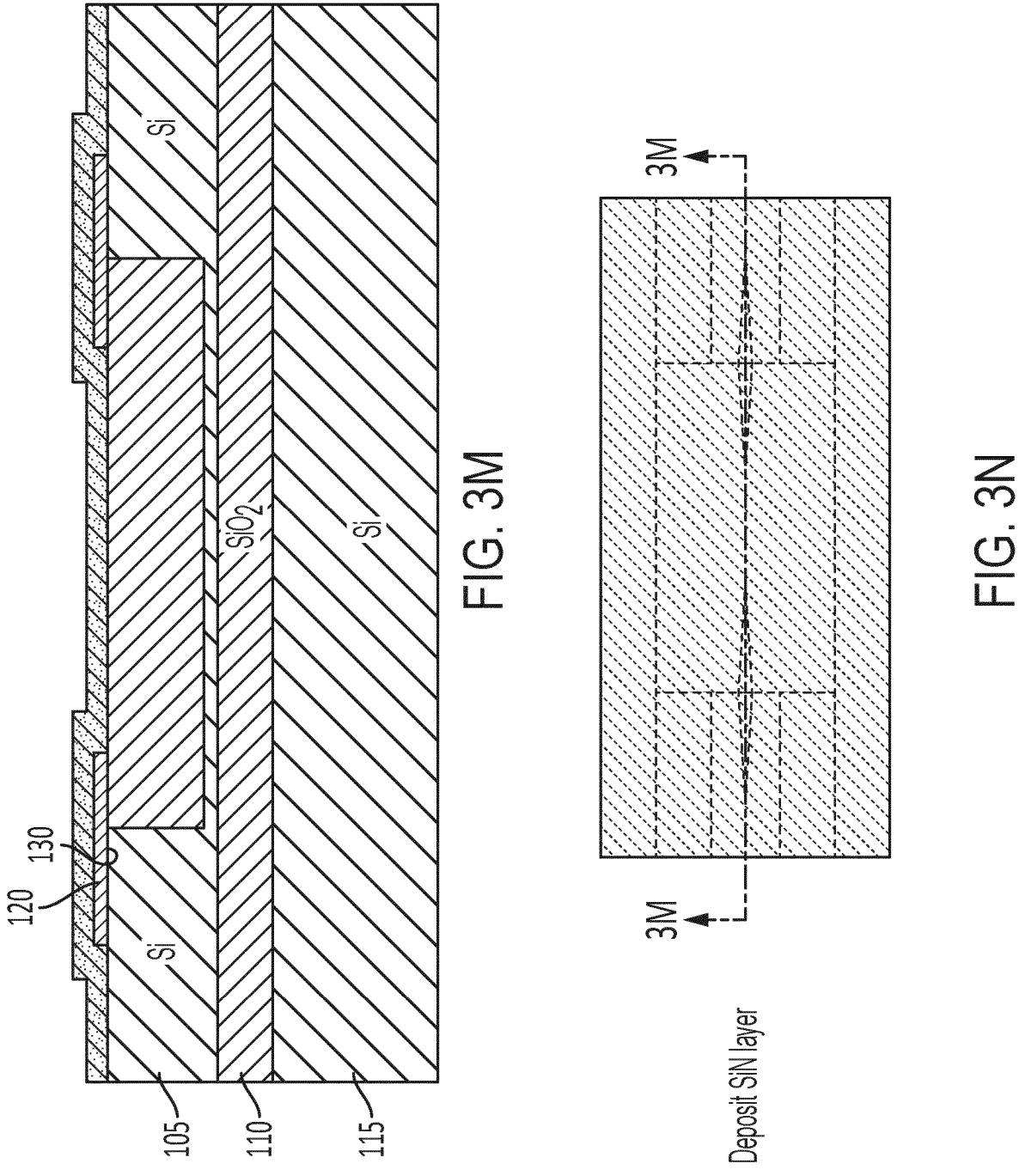
FIG. 3M is cross-sectional view of an intermediate product, according to an embodiment of the present disclosure.
FIG. 3N is a top view of an intermediate product, according to an embodiment of the present disclosure.
Figures 3O, 3P:
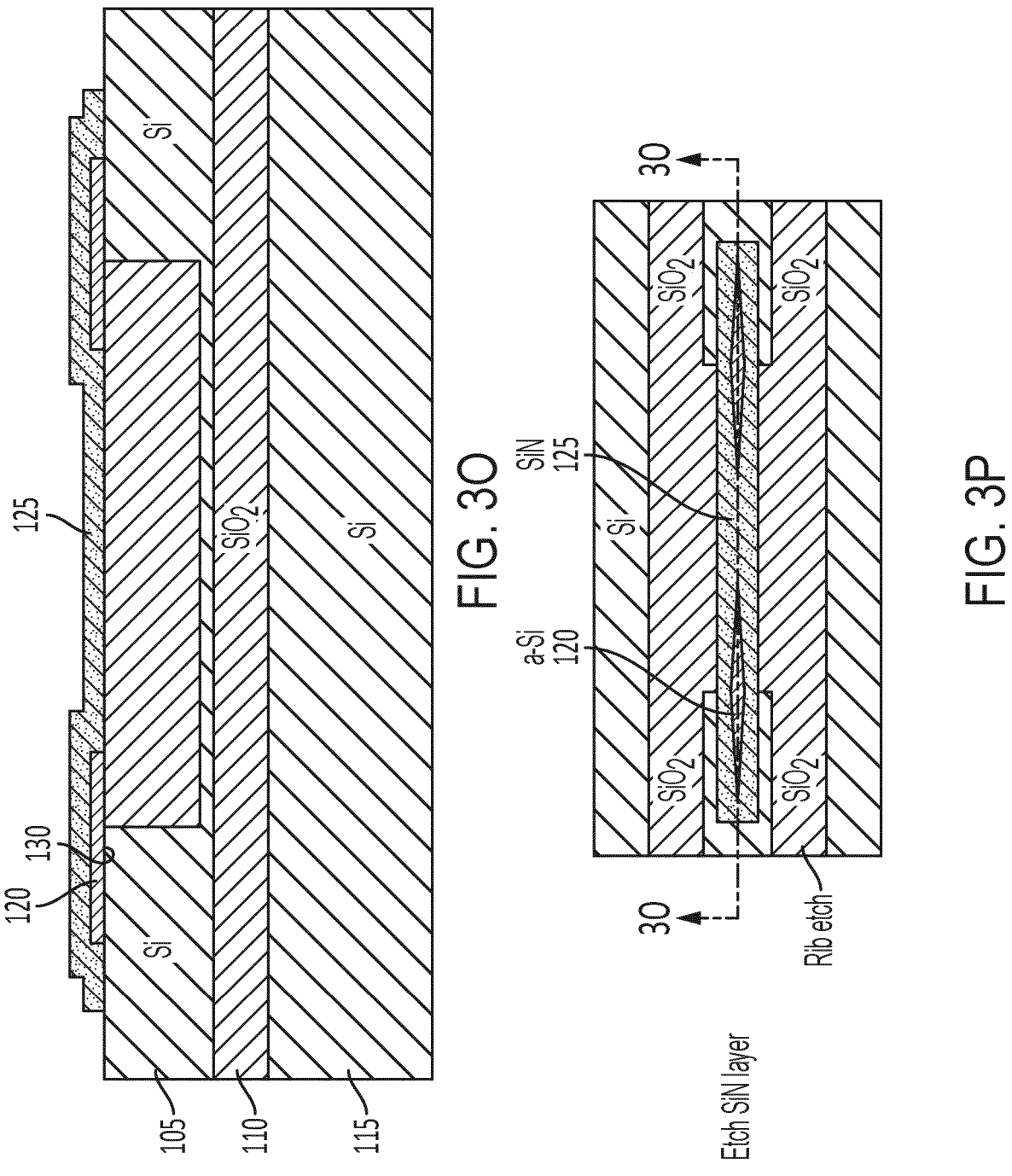
FIG. 3O is cross-sectional view of an intermediate product, according to an embodiment of the present disclosure.
FIG. 3P is a top view of an intermediate product, according to an embodiment of the present disclosure.
Figures 3Q, 3R:
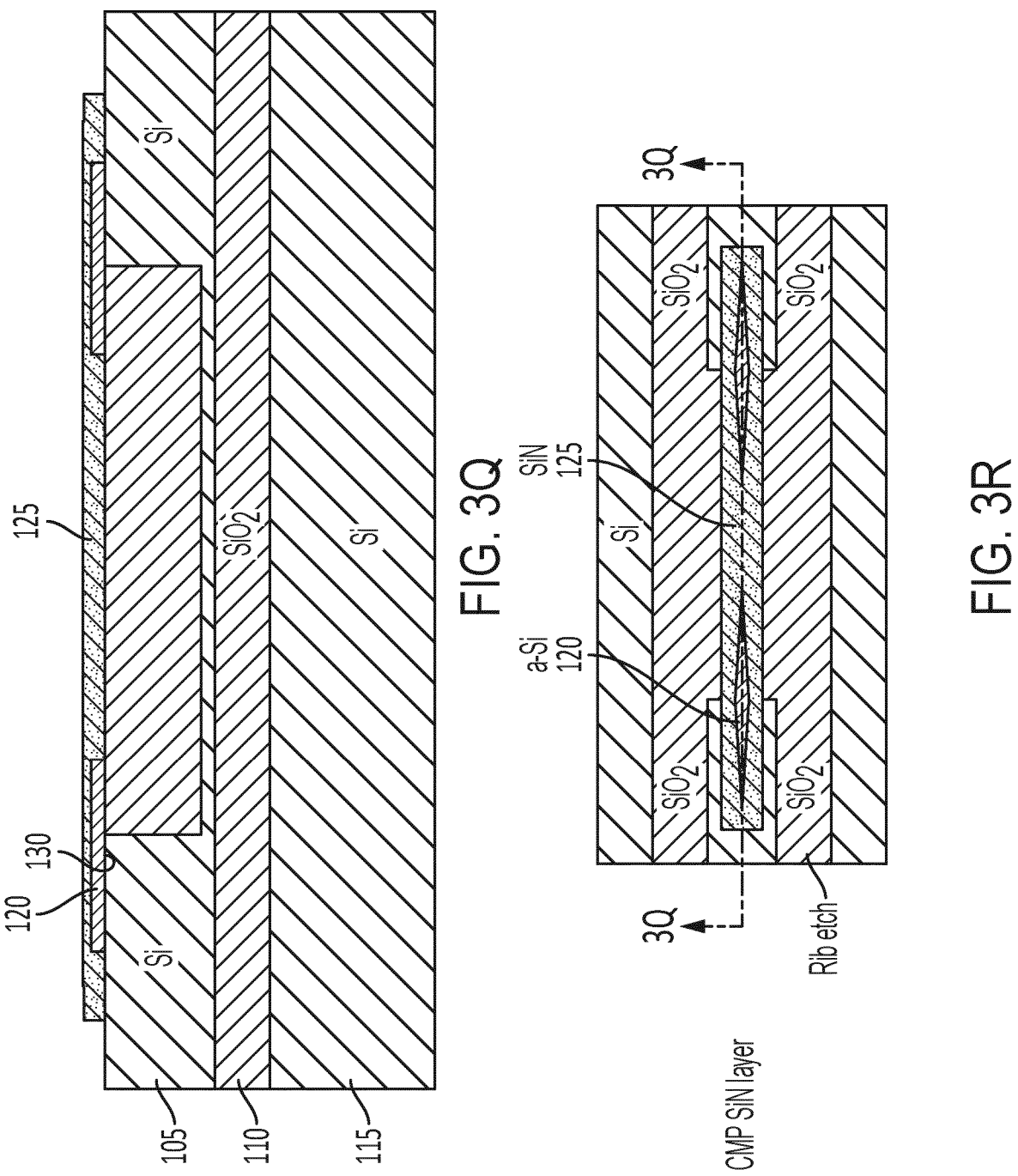
FIG. 3Q is cross-sectional view of a waveguide structure, according to an embodiment of the present disclosure.
FIG. 3R is a top view of a waveguide structure, according to an embodiment of the present disclosure.

FIGS. 3A-3R are illustrations of intermediate products and final products in a method for fabricating the waveguide structure of FIGS. 2A and 2B. Each pair of drawings includes a cross-sectional view (e.g., FIG. 3A) and a top view (e.g., FIG. 3B), the cross-sectional view being taken along a section line (e.g., section line 3A-3A) shown in the top view. The process corresponding to the embodiment of FIGS. 3A-3R includes performing a first etch (or "rib etch") and a second etch (or "strip etch") to form (i) trenches 305 on both sides of the rib of the first waveguide 105 and (ii) a cavity 310 in the device layer, as shown in FIGS. 3A and 3B. The strip etch may remove all or nearly all of the crystalline silicon in the region of the cavity 310 (e.g., all except a thin (e.g., about 100 nm thick) layer at the bottom of the cavity 310). In some embodiments, a single etch is used to form both the trenches 305 and the cavity 310, and the cavity 310 is correspondingly shallower (or, if the crystalline silicon waveguides including the first waveguide 105 are strip waveguides, the trenches 305 may, like the cavity 310, extend all the way down to the buried oxide layer 110, or nearly all the way down to the buried oxide layer 110).

The process further includes depositing a conformal coating of silicon dioxide, filling the trenches 305 and the cavity 310 (FIGS. 3C and 3D), using chemical-mechanical polishing (CMP) to planarize the top surface (FIGS. 3E and 3F), depositing a thin layer of amorphous silicon dioxide (e.g., a layer of amorphous silicon dioxide having a thickness of between 10 nm and 200 nm) on the top surface (FIGS. 3G and 3H), depositing a layer of amorphous silicon on the top surface (FIGS. 3I and 3J), etching the layer of amorphous silicon to form the second waveguide 120 (FIGS. 3K and 3L), depositing a layer of silicon nitride on the top surface (FIGS. 3M and 3N), etching the layer of silicon nitride to form the third waveguide 125 (FIGS. 3O and 3P), and, optionally, using chemical-mechanical polishing to planarize the top surface (FIGS. 3Q and 3R). In some embodiments, the chemical-mechanical polishing is instead performed before the etching of the layer of silicon nitride to form the third waveguide 125.

Figures 4A, 4B:
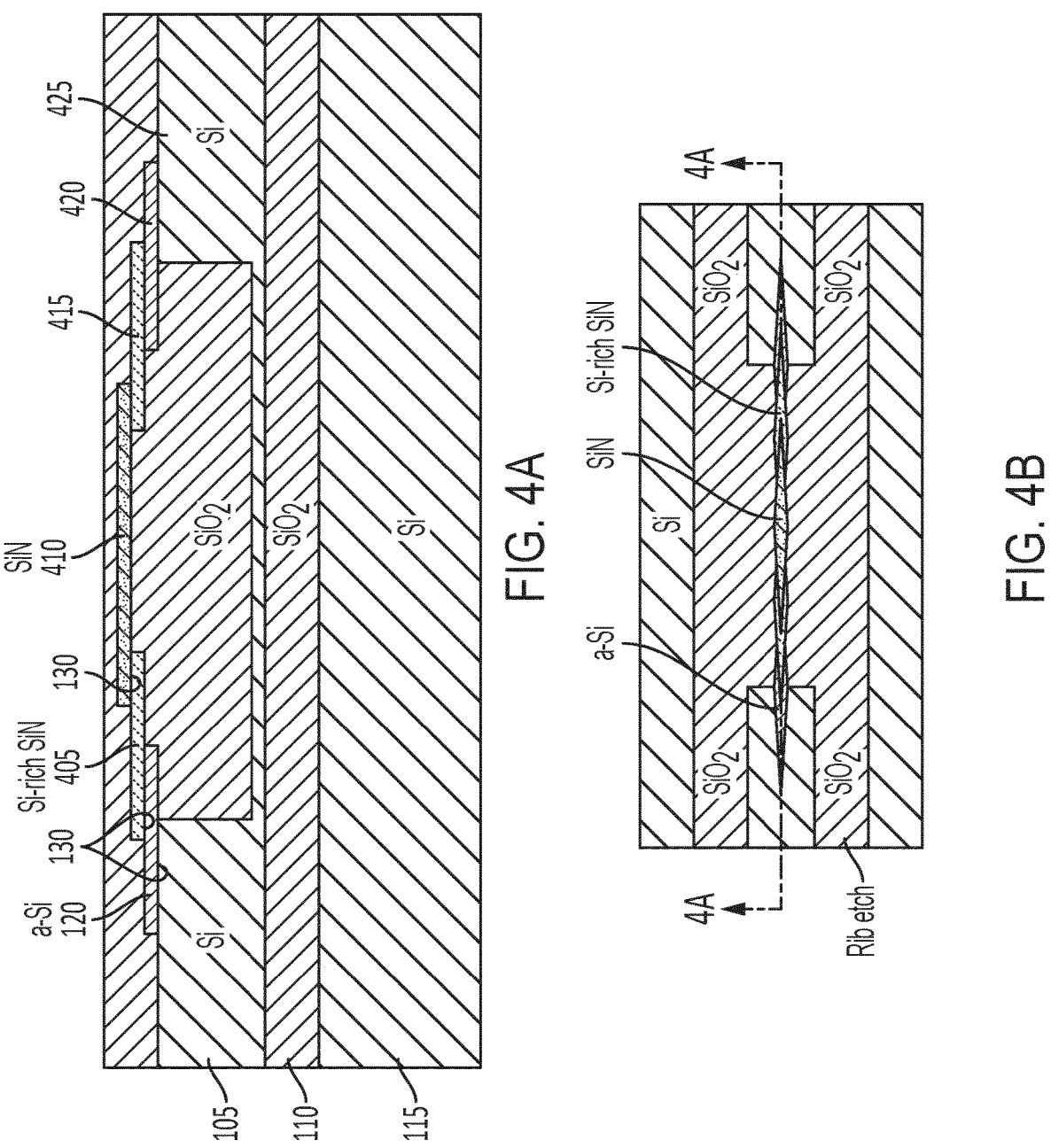
FIG. 4A is cross-sectional view of a waveguide structure, according to an embodiment of the present disclosure.
FIG. 4B is a top view of a waveguide structure, according to an embodiment of the present disclosure.

FIGS. 4A and 4B show a cross-sectional view (taken along section line 4A-4A in FIG. 4B) and a top view, respectively, of a structure, according to another embodiment, formed on a silicon on insulator wafer. In the embodiment of FIGS. 4A and 4B, the first waveguide 105 and the second waveguide 120 are similar to those of the embodiment of FIGS. 2A and 2B. A third waveguide 405, composed of silicon-rich silicon nitride, is coupled to the second waveguide 120 and a fourth waveguide 410 is coupled to the third waveguide 405, as shown. Each of the second waveguide 120, the third waveguide 405, and the fourth waveguide 410 may have a narrowing taper at each end, as shown in FIG. 4B. The shapes of these waveguides, and their proximity to each other, may cause light to couple from one to the other as mentioned above. In the embodiment of FIGS. 4A and 4B, additional waveguides to the right of the fourth waveguide (e.g., a fifth waveguide 415, and a sixth waveguide 420) are present to couple light to a crystalline silicon waveguide (which may be referred to as a seventh waveguide 425) on the opposite side of the cavity 310 (FIG. 3A) from the first waveguide 105.

The silicon-rich silicon nitride of the third waveguide 405 may have an atomic ratio, of silicon to nitrogen, of at least 1.5, and the silicon nitride of the fourth waveguide 410 may have an atomic ratio, of silicon to nitrogen, between 0.6 and 1.5. Thin intervening layers 130 of $SiO_2$ (e.g., intervening layers 130 each having a thickness of between 10 nm and 200 nm) may be present between the pairs of overlapping waveguides, e.g., between the first waveguide 105 and the second waveguide 120, between the second waveguide 120 and the third waveguide 405, and between the third waveguide 405 and the fourth waveguide 410. In the embodiments of FIGS. 4A and 4B, the third waveguide 405 may have an index of refraction between that of the second waveguide 120 and that of the fourth waveguide 410 (e.g., the third waveguide 405 may have an index of refraction that is within 50% of the average of (i) the index of refraction of the second waveguide 120 and (ii) the index of refraction of the fourth waveguide 410), i.e., the difference in refractive index between adjacent waveguides may be less than it would be if the third waveguide 405 were absent and the second waveguide 120 were directly adjacent to, and directly coupled to, the fourth waveguide 410. This may result in improved coupling efficiency from the first waveguide 105 to the fourth waveguide 410 (through the second waveguide 120 and the third waveguide 405), especially if the method employed to fabricate the waveguides limits the achievable narrowness of the narrow end of a taper.

Dimensions for waveguide structures such as that of FIGS. 2A and 2B, or that of FIGS. 4A and 4B, may be selected using electromagnetic simulation software (which may use a method such as, for example, a full wave finite-difference time-domain (FDTD) method, an eigenmode expansion method, or a beam propagation method) to predict the coupling between overlapping waveguides. In such a design process, the dimensions may be adjusted incrementally (e.g., manually, or by an automated gradient ascent method) until the coupling between the waveguides of a pair of overlapping waveguides is sufficiently great, or until it is substantially maximized. The film thicknesses of the a-Si, Si-rich SiN, and SiN may be in the range of 200 nm to 800 nm. FIGS. 2A-6D are drawn to scale, in the transverse dimensions, for some embodiments (the dimensions may vary in other embodiments). These drawings are significantly compressed in the longitudinal dimension (along the direction of propagation of light), in part so that the tapers of tapered waveguides are perceptible. In a real waveguide structure corresponding to the embodiment of FIGS. 2A and 2B, or to the embodiment of FIGS. 4A and 4B, the length of each region of overlap within which light couples between overlapping waveguides may be at least 20 times as great as the smaller transverse dimension, and it may be 100 times, or more than 100 times, as great as the smaller transverse dimension. In some embodiments, optical coupling from a silicon waveguide with a width of 2 microns or more to a silicon nitride waveguide, with a loss of between 0.0 dB and 1.0 dB (e.g., with a loss of between 0.02 dB and 0.2 dB) may be achieved. An upper layer (e.g., an oxide layer) is drawn transparent in some of the top views, e.g., in FIGS. 3L, 3P, 3R, 4B, 5D, 5H, 5L, 5P, 5R, 6B, and 6D.

Figures 5A, 5B:
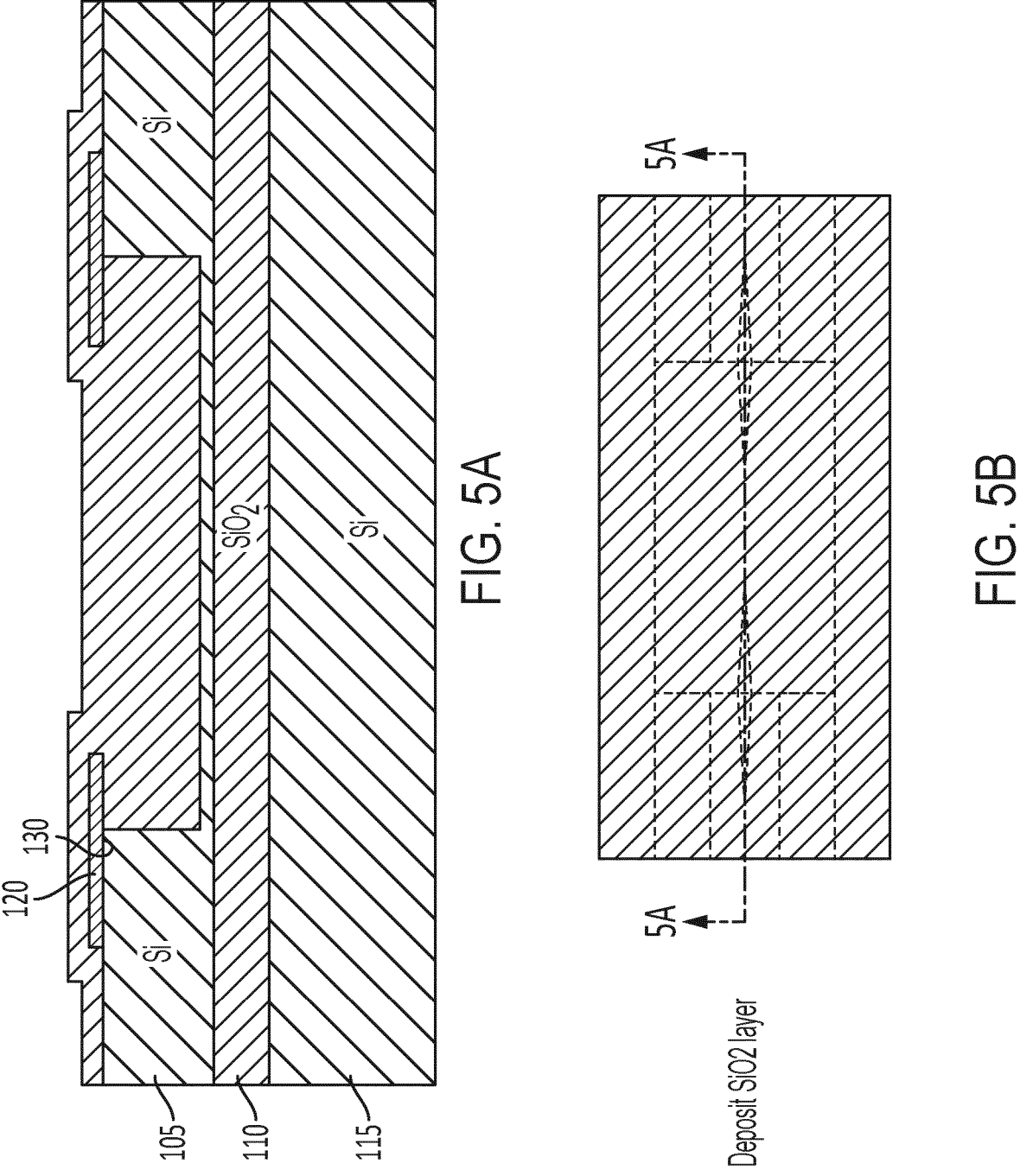
FIG. 5A is cross-sectional view of a waveguide structure, according to an embodiment of the present disclosure.
FIG. 5B is a top view of an intermediate product, according to an embodiment of the present disclosure.
Figures 5C, 5D:
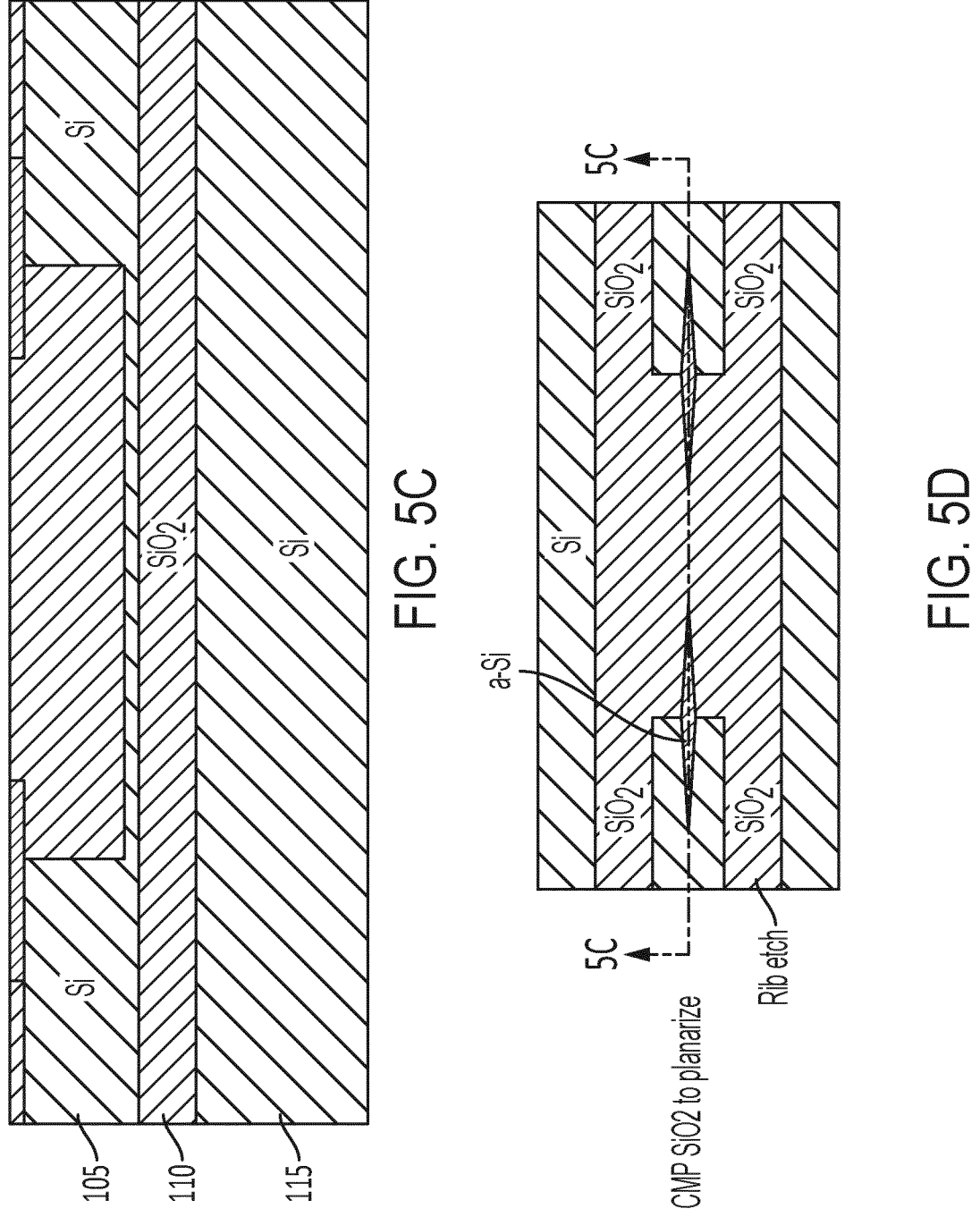
FIG. 5C is cross-sectional view of an intermediate product, according to an embodiment of the present disclosure.
FIG. 5D is a top view of an intermediate product, according to an embodiment of the present disclosure.
Figures 5E, 5F:
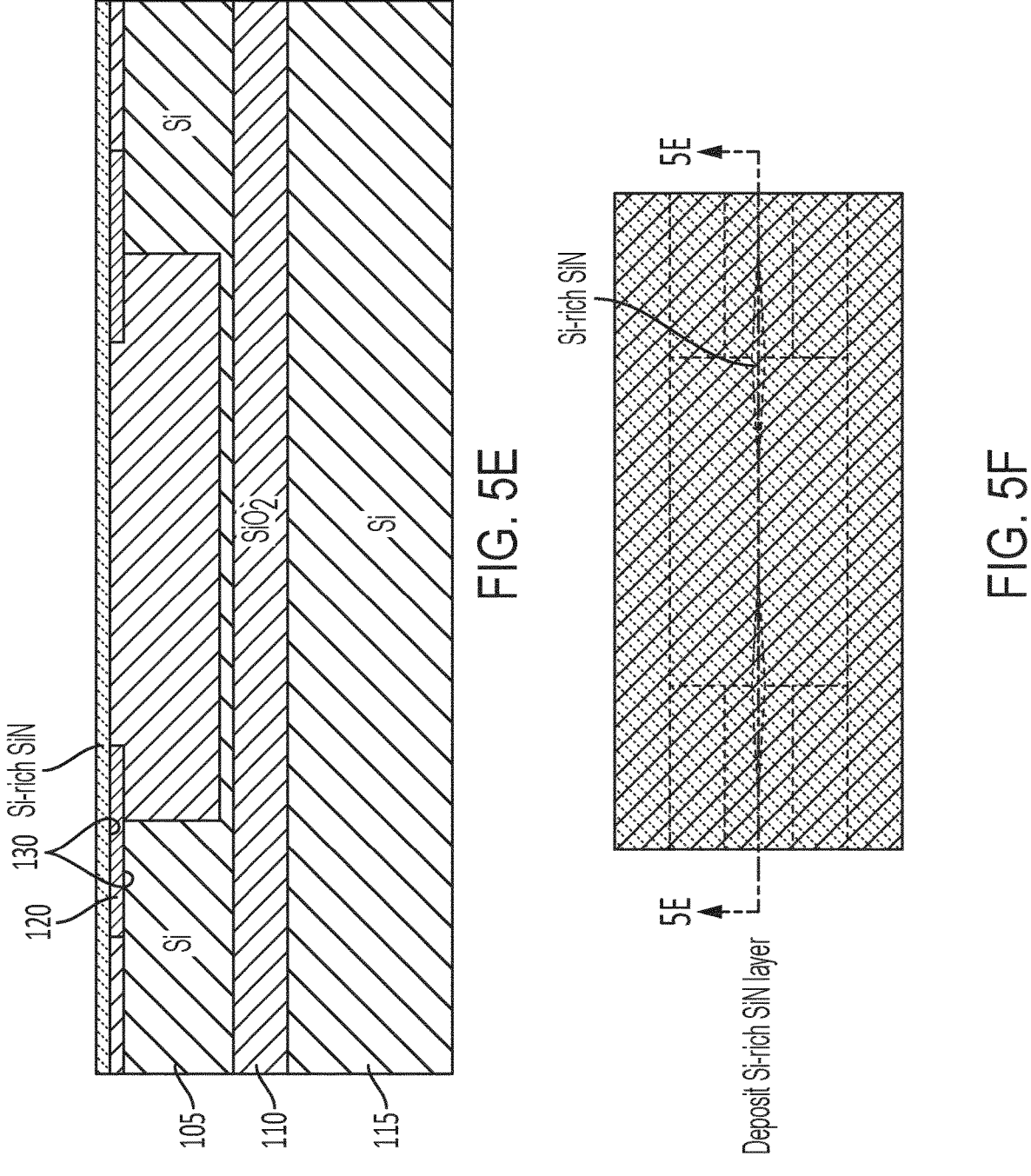
FIG. 5E is cross-sectional view of an intermediate product, according to an embodiment of the present disclosure.
FIG. 5F is a top view of an intermediate product, according to an embodiment of the present disclosure.
Figures 5G, 5H:
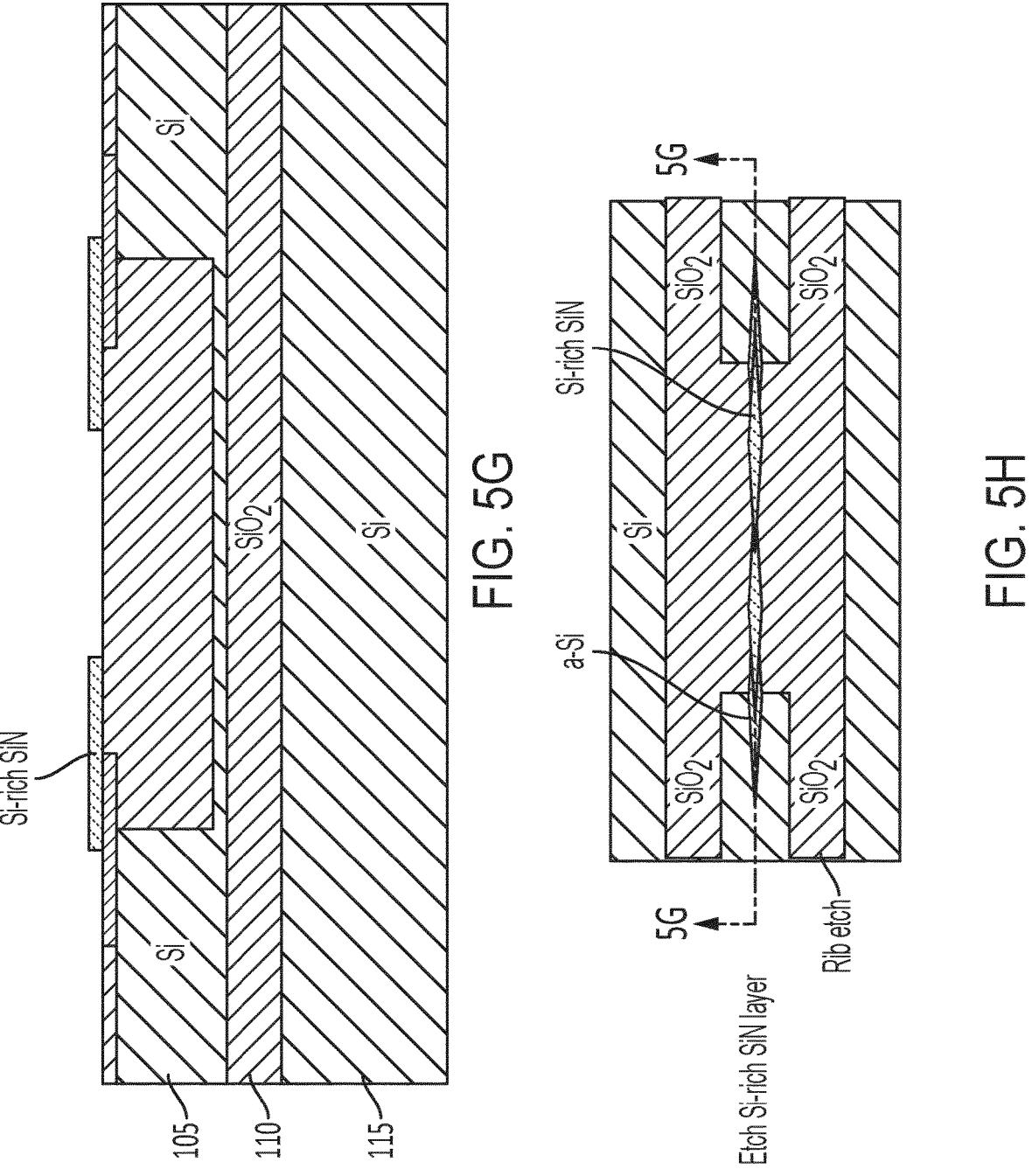
FIG. 5G is cross-sectional view of an intermediate product, according to an embodiment of the present disclosure.
FIG. 5H is a top view of an intermediate product, according to an embodiment of the present disclosure.
Figures 5I, 5J:
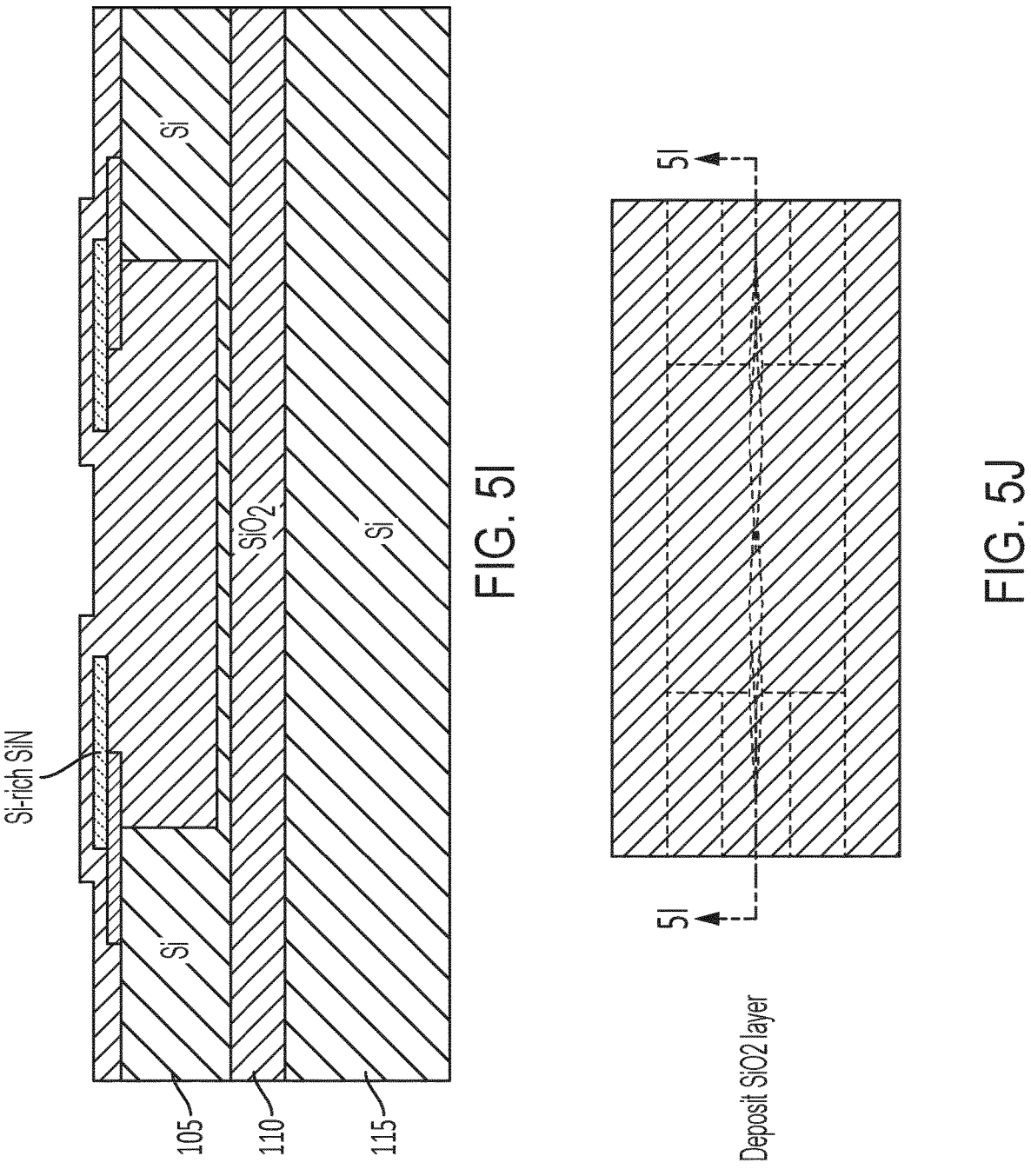
FIG. 5I is cross-sectional view of an intermediate product, according to an embodiment of the present disclosure.
FIG. 5J is a top view of an intermediate product, according to an embodiment of the present disclosure.
Figures 5K, 5L:
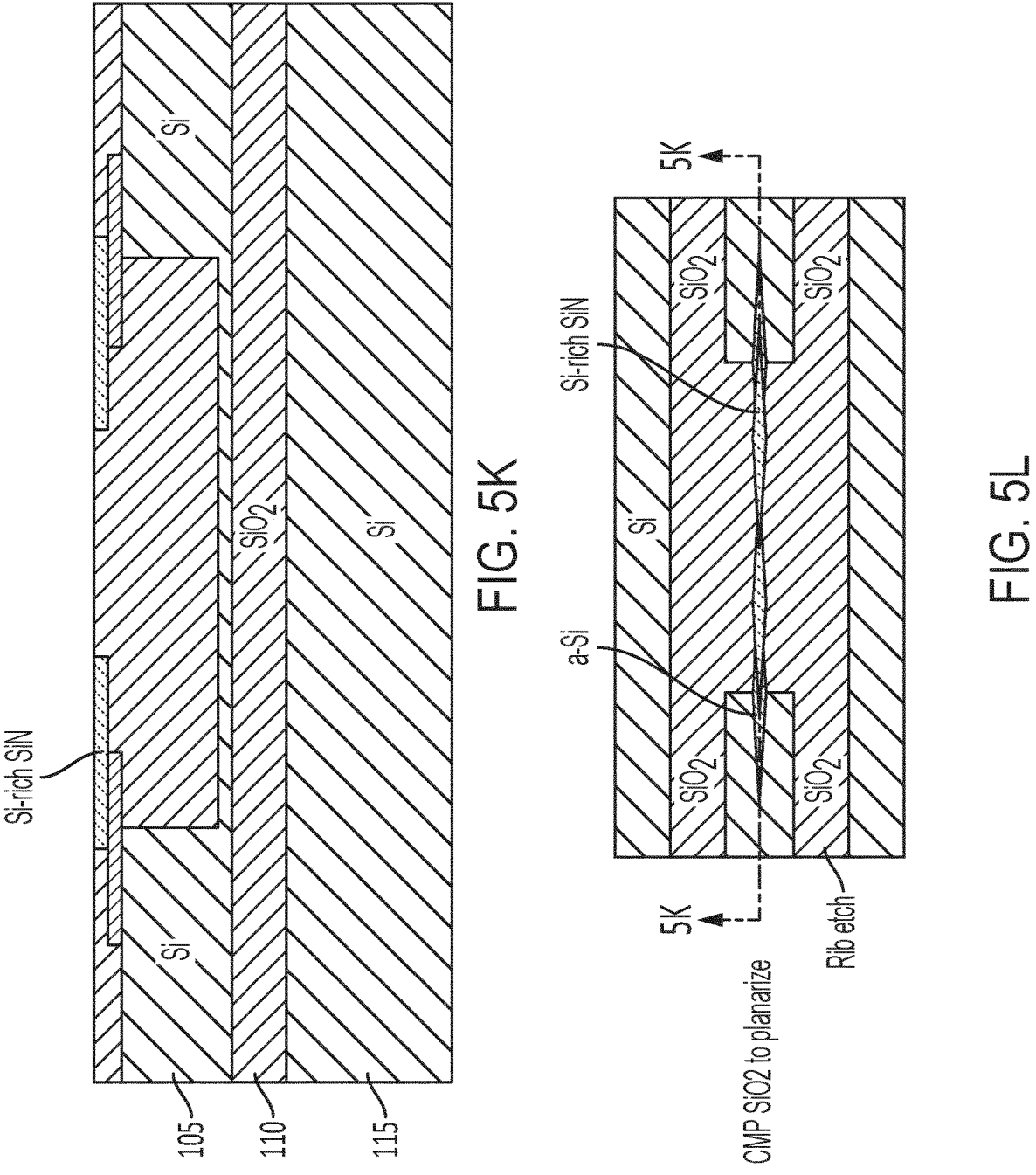
FIG. 5K is cross-sectional view of an intermediate product, according to an embodiment of the present disclosure.
FIG. 5L is a top view of an intermediate product, according to an embodiment of the present disclosure.
Figures 5M, 5N:
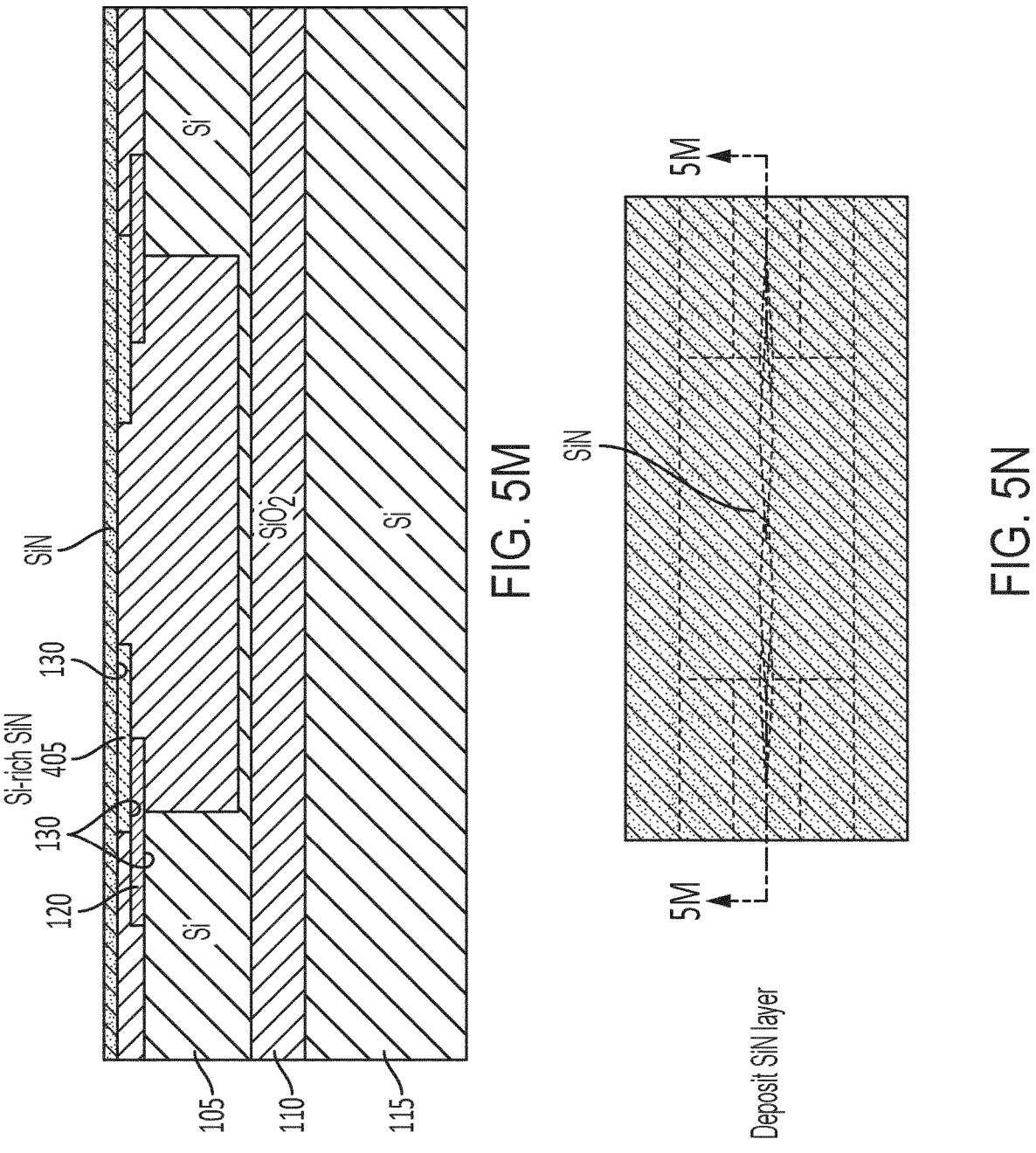
FIG. 5M is cross-sectional view of an intermediate product, according to an embodiment of the present disclosure.
FIG. 5N is a top view of an intermediate product, according to an embodiment of the present disclosure.
Figures 5O, 5P:
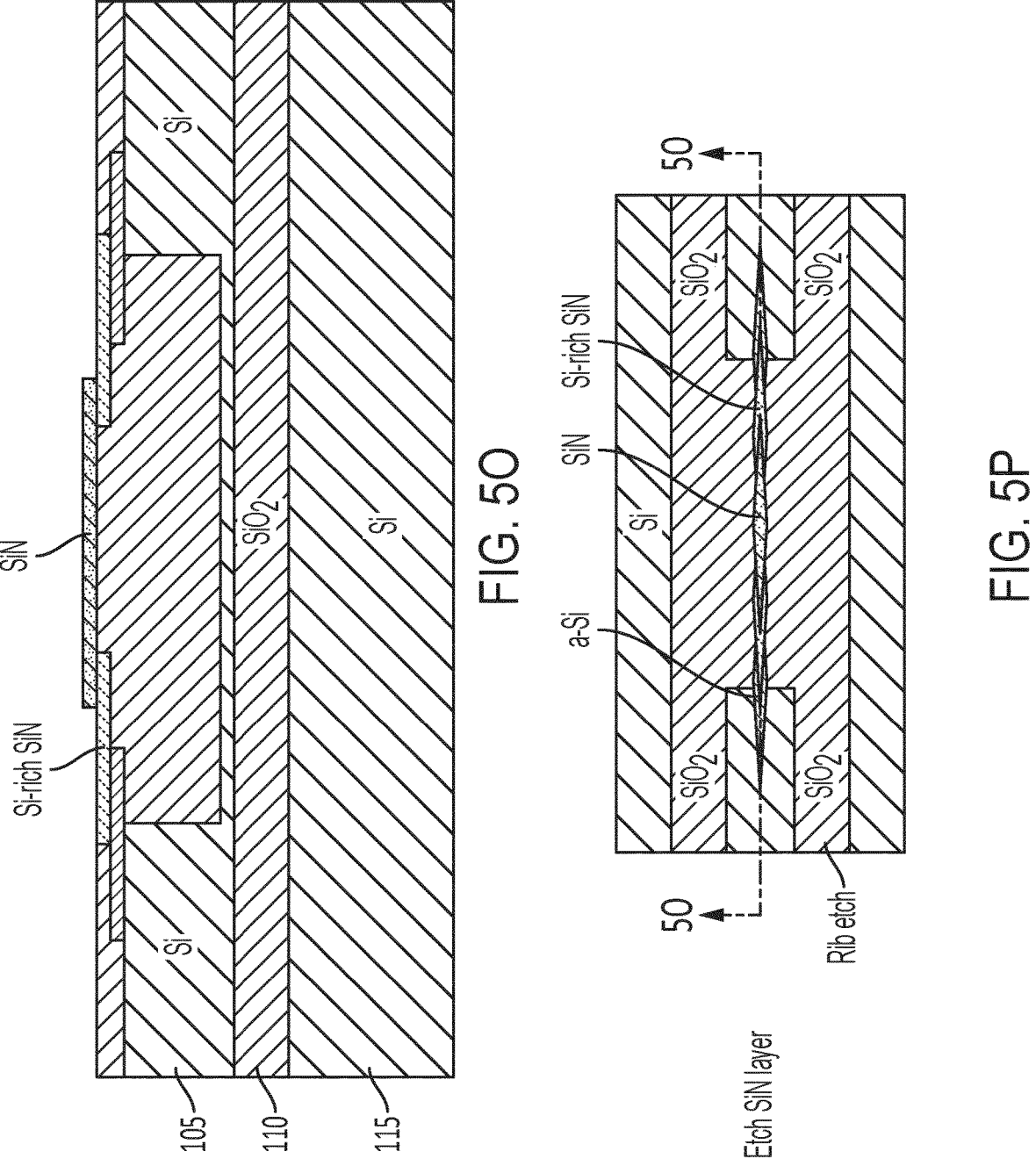
FIG. 5O is cross-sectional view of an intermediate product, according to an embodiment of the present disclosure.
FIG. 5P is a top view of an intermediate product, according to an embodiment of the present disclosure.
Figures 5Q, 5R:
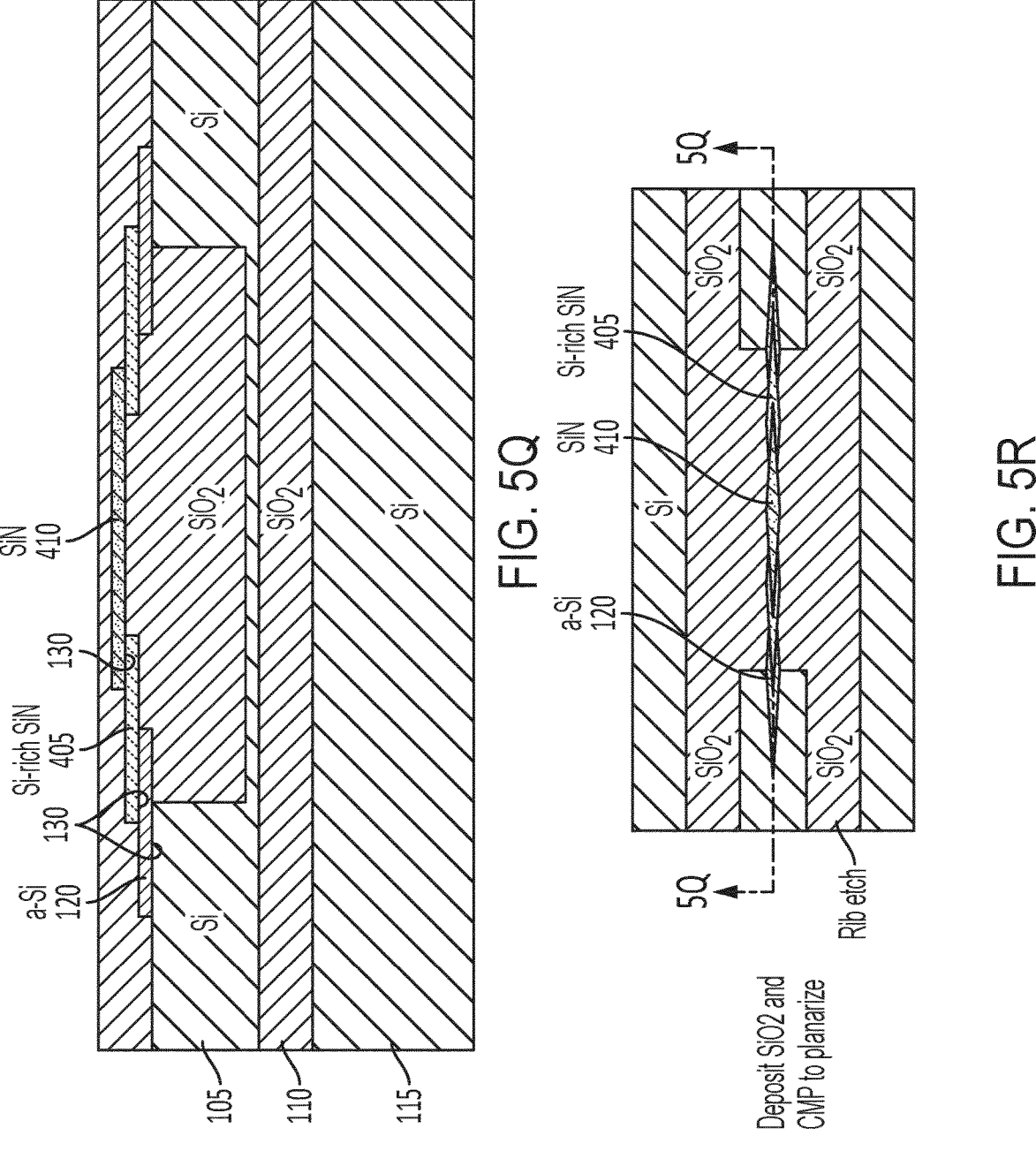
FIG. 5Q is cross-sectional view of a waveguide structure, according to an embodiment of the present disclosure.
FIG. 5R is a top view of a waveguide structure, according to an embodiment of the present disclosure.

A method for fabricating the embodiment of FIGS. 4A and 4B may include the same first six process steps as the method for fabricating the embodiment of FIGS. 2A and 2B, i.e., the steps for which the intermediate products are illustrated in FIGS. 3A-3L. These first six process steps may result in the intermediate product of FIGS. 3K and 3L, as described above. The following process steps, illustrated, in FIGS. 5A-5R, with drawings of the respective intermediate products or final product that result, may then be performed. FIGS. 5A-5R are illustrations of intermediate products and a final product in a method for fabricating the waveguide structure of FIGS. 4A and 4B. As is the case for FIGS. 3A-3R, each pair of drawings of FIGS. 5A-5R includes a cross-sectional view (e.g., FIG. 5A) and a top view (e.g., FIG. 5B), the cross-sectional view being taken along a section line (e.g., section line 5A-5A) shown in the top view. The process includes depositing a layer of SiO2 on the top surface (FIGS. 5A and 5B), using chemical-mechanical polishing to planarize the top surface (FIGS. 5C and 5D), depositing a thin layer of SiO2, followed by a layer of silicon-rich silicon nitride on the top surface (FIGS. 5E and 5F), etching the layer of silicon-rich silicon nitride to form waveguides (FIGS. 5G and 5H), depositing a layer of SiO2 on the top surface (FIGS. 5I and 5J), using chemical-mechanical polishing to planarize the top surface (FIGS. 5K and 5L), depositing a thin layer of SiO2, followed by a layer of silicon nitride, on the top surface (FIGS. 5M and 5N), etching the layer of silicon nitride to form a waveguide (FIGS. 5O and 5P), and depositing a layer of SiO2 on the top surface (and, optionally, using chemical-mechanical polishing to planarize the top surface) (FIGS. 5Q and 5R).

Figures 6A, 6B:
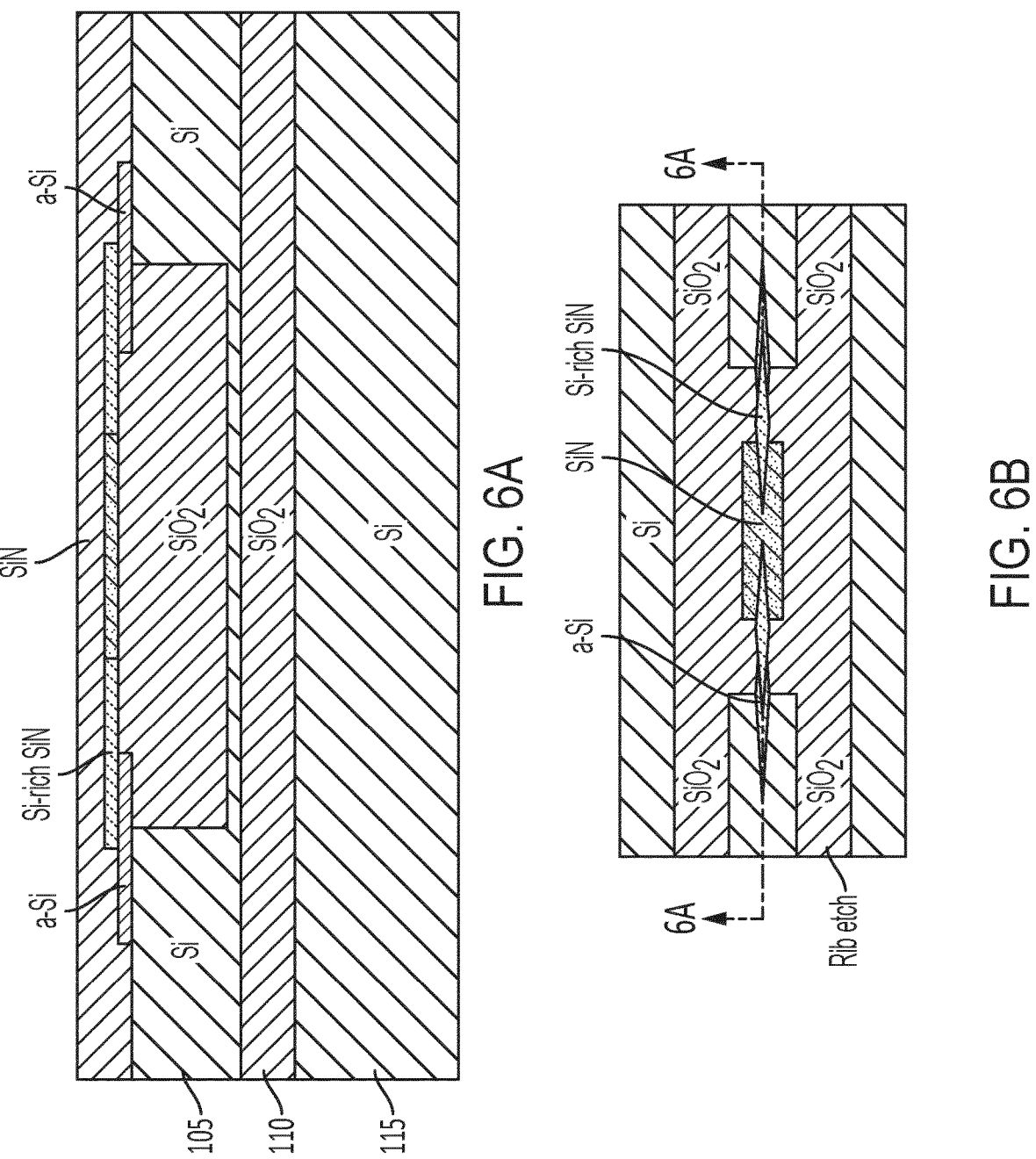
FIG. 6A is cross-sectional view of a waveguide structure, according to an embodiment of the present disclosure.
FIG. 6B is a top view of an intermediate product, according to an embodiment of the present disclosure.
Figures 6C, 6D:
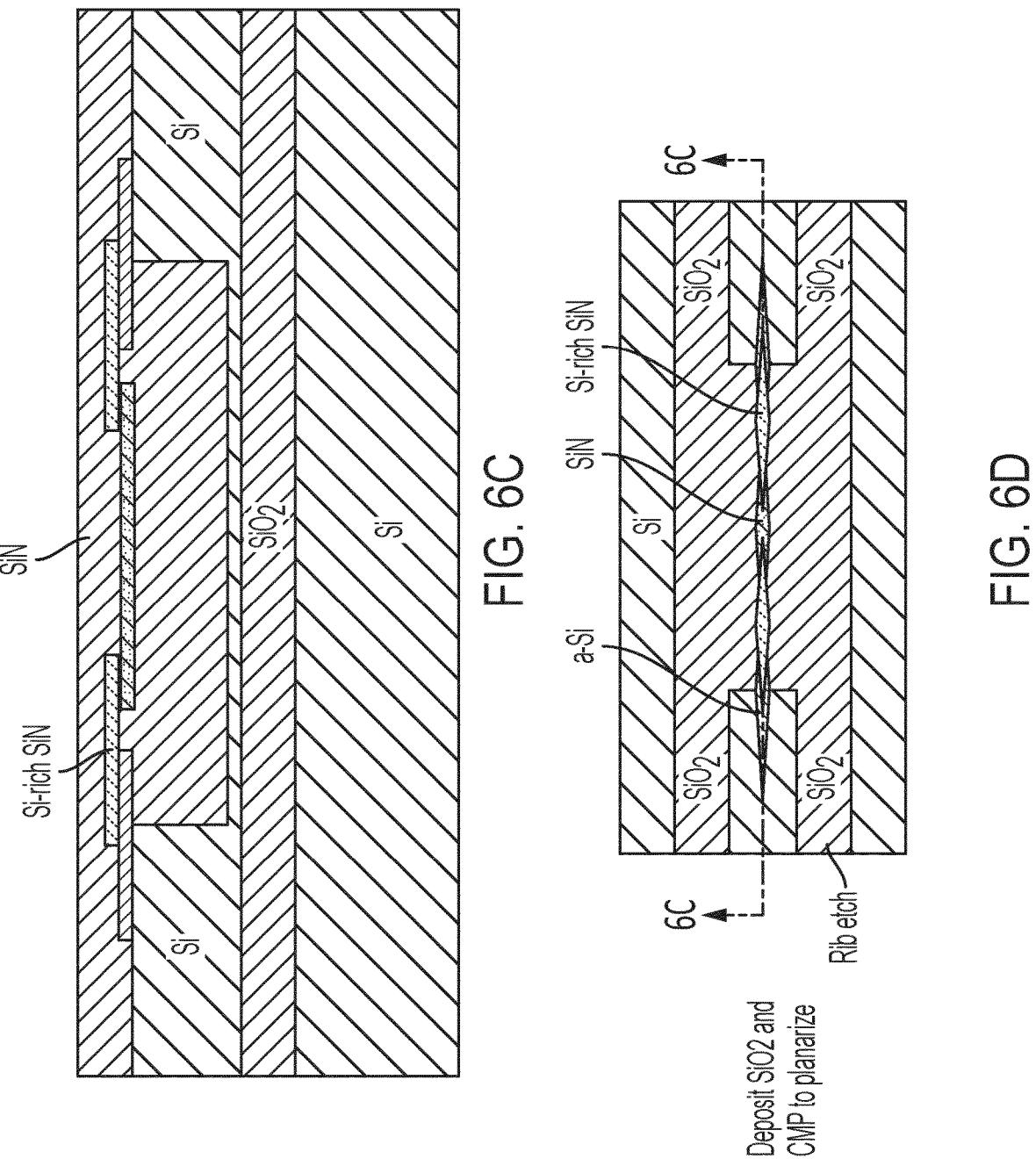
FIG. 6C is cross-sectional view of a waveguide structure, according to an embodiment of the present disclosure.
FIG. 6D is a top view of an intermediate product, according to an embodiment of the present disclosure.

Various variations on and combinations of the methods and structures disclosed herein may be constructed and employed. For example, instead of the fourth waveguide being higher than the third waveguide, forming an "escalator structure" as in FIGS. 4A and 4B, an in-plane coupling structure (as illustrated in FIGS. 3O and 3R) may be employed, e.g., to form the structure of FIGS. 6A and 6B. As another example, some of the waveguides may be at the same height as one or more waveguides of a different material, as shown in FIGS. 6C and 6D.

In some embodiments, such as those described above, the challenge of integrating silicon nitride into a 3 um Si waveguide platform is addressed by use of an amorphous silicon "escalator" to couple to a silicon nitride waveguide that lies above the 3 um silicon device layer instead of being in plane with it. This approach alleviates challenges with both silicon nitride film deposition as well as chemical-mechanical polishing required to make the film planar.

Some embodiments employ operating wavelengths in the range 1.2 microns to 2.5 microns. Any statement made herein regarding a wavelength-dependent property (such as an index of refraction) may be understood to apply at at least one of the wavelengths in the range of operating wavelengths. As used herein, the term "waveguide" may be used to describe an entire structure (e.g., a high-index core, and a lower-index cladding) that is capable of guiding light (i.e., confining the light in the transverse dimensions), or it may be used to describe a portion of the structure or a subset of its elements (e.g., the core, or the rib of a rib waveguide) sufficient to determine the direction of propagation of the light. As used herein, a first waveguide is at a different height (or at a greater height) than a second waveguide if the top of the guiding feature of the first waveguide is at a different height (or at a greater height) than the top of the guiding feature of the second waveguide, where the "guiding feature" of a rib waveguide is the rib, and the "guiding feature" of a strip waveguide is the strip, and where each height is measured from a reference plane parallel to the substrate (e.g., from the bottom surface of the BOX layer). As used herein, a "strip waveguide" consists of a strip of high-index material, the strip having a rectangular cross section and being surrounded by one or more lower index materials. As used herein, a first waveguide "overlaps" a second waveguide if, along the direction of propagation, there exists a region (a "region of overlap") within which both waveguides are present. As used herein, the "thickness" of a waveguide is the dimension of a guiding feature in a direction perpendicular to the substrate, and the "width" of a waveguide is the dimension of a guiding feature of the waveguide in a direction perpendicular to the direction of propagation of light and parallel to the substrate.

As used herein, "a portion of" something means "at least some of" the thing, and as such may mean less than all of, or all of, the thing. As such, "a portion of" a thing includes the entire thing as a special case, i.e., the entire thing is an example of a portion of the thing. As used herein, the term "rectangle" includes a square as a special case, i.e., a square is an example of a rectangle, and something that is square is also "rectangular". As used herein, when a second number is "within Y %" of a first number, it means that the second number is at least $(1-Y/100)$ times the first number and the second number is at most $(1+Y/100)$ times the first number. As used herein, the word "or" is inclusive, so that, for example, "A or B" means any one of (i) A, (ii) B, and (iii) A and B.

It will be understood that, although the terms "first", "second", "third", etc., may be used herein to describe various elements, components, regions, layers and/or sections, these elements, components, regions, layers and/or sections should not be limited by these terms. These terms are only used to distinguish one element, component, region, layer or section from another element, component, region, layer or section. Thus, a first element, component, region, layer or section discussed herein could be termed a second element, component, region, layer or section, without departing from the spirit and scope of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that such spatially relative terms are intended to encompass different orientations of the device in use or in operation, in addition to the orientation depicted in the figures. For example, if the device in the figures is turned over, elements described as "below" or "beneath" or "under" other elements or features would then be oriented "above" the other elements or features. Thus, the example terms "below" and "under" can encompass both an orientation of above and below. The device may be otherwise oriented (e.g., rotated 90 degrees or at other orientations) and the spatially relative descriptors used herein should be interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the terms "substantially," "about," and similar terms are used as terms of approximation and not as terms of degree, and are intended to account for the inherent deviations in measured or calculated values that would be recognized by those of ordinary skill in the art. As used herein, the term "major component" refers to a component that is present in a composition, polymer, or product in an amount greater than an amount of any other single component in the composition or product. In contrast, the term "primary component" refers to a component that makes up at least 50% by weight or more of the composition, polymer, or product. As used herein, the term "major portion", when applied to a plurality of items, means at least half of the items. As used herein, any structure or layer that is described as being "made of" or "composed of" a substance should be understood (i) in some embodiments, to contain that substance as the primary component or (ii) in some embodiments, to contain that substance as the major component.

As used herein, the singular forms "a" and "an" are intended to include the plural forms as well, unless the context clearly indicates otherwise. It will be further understood that the terms "comprises" and/or "comprising", when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the inventive concept refers to "one or more embodiments of the present disclosure". Also, the term "exemplary" is intended to refer to an example or illustration. As used herein, the terms "use," "using," and "used" may be considered synonymous with the terms "utilize," "utilizing," and "utilized," respectively.

It will be understood that when an element or layer is referred to as being "on", "connected to", "coupled to", or "adjacent to" another element or layer, it may be directly on, connected to, coupled to, or adjacent to the other element or layer, or one or more intervening elements or layers may be present. In contrast, when an element or layer is referred to as being "directly on", "directly connected to", "directly coupled to", or "immediately adjacent to" another element or layer, there are no intervening elements or layers present.

Any numerical range recited herein is intended to include all sub-ranges of the same numerical precision subsumed within the recited range. For example, a range of "1.0 to 10.0" or "between 1.0 and 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein.

Although exemplary embodiments of a waveguide structure have been specifically described and illustrated herein, many modifications and variations will be apparent to those skilled in the art. Accordingly, it is to be understood that a waveguide structure constructed according to principles of this disclosure may be embodied other than as specifically described herein. The invention is also defined in the following claims, and equivalents thereof.

What is claimed is:

1. A waveguide structure, comprising:
a first waveguide on a substrate;
a second waveguide on the substrate; and
a third waveguide on the substrate,
the first waveguide, the second waveguide, and the third waveguide each being substantially parallel to the substrate,
the first waveguide being at a different height than the second waveguide,
the first waveguide and the second waveguide being configured to cause light to couple between the first waveguide and the second waveguide,
the second waveguide and the third waveguide being configured to cause light to couple between the second waveguide and the third waveguide,
the first waveguide being composed of a first material having a first index of refraction,
the second waveguide being composed of a second material having a second index of refraction,
the third waveguide being composed of a third material having a third index of refraction, the third material including silicon and nitrogen, and
the second index of refraction being greater than the first index of refraction, and less than the third index of refraction,
wherein the first waveguide is a waveguide in a crystalline silicon layer on a buried oxide layer, the crystalline silicon layer having a thickness of more than 1 micron,
wherein the waveguide structure further comprises a fourth waveguide and a fifth waveguide,
wherein the fourth waveguide is at a same height as the first waveguide,
wherein the fourth waveguide is in the crystalline silicon layer above the buried oxide layer and laterally spaced apart from the first waveguide by a layer of silicon dioxide,
wherein the second waveguide is above, and overlaps in a plan view with, the first waveguide in a region of overlap,
wherein the fifth waveguide is above, and overlaps in the plan view with, the fourth waveguide,
wherein the fifth waveguide comprises the second material, wherein the third waveguide is above, and overlaps in the plan view with, each of the second waveguide, the layer of silicon dioxide, and the fifth waveguide, wherein the third waveguide and the fifth waveguide are configured to cause light to couple between the third waveguide and the fifth waveguide, and wherein the fifth waveguide and the fourth waveguide are configured to cause light to couple between the fifth waveguide and the fourth waveguide.

2. The waveguide structure of claim 1, wherein the second waveguide has a first taper and a second taper, the second waveguide having a width increasing along a first longitudinal direction within the first taper and decreasing along the first longitudinal direction within the second taper.

3. The waveguide structure of claim 2, wherein a portion of the first taper is in the region of overlap.

4. The waveguide structure of claim 1, wherein the second waveguide is composed of amorphous silicon.

5. The waveguide structure of claim 1, wherein the third material is silicon nitride.

6. The waveguide structure of claim 1, comprising a first intervening layer, between the first waveguide and the second waveguide, the first intervening layer being composed of a fourth material, having a fourth index of refraction.

7. The waveguide structure of claim 6, further comprising a sixth waveguide on the substrate, wherein:

the sixth waveguide is composed of a fifth material having a fifth index of refraction, and the third waveguide and the sixth waveguide are configured to cause light to couple between the third waveguide and the sixth waveguide.

8. The waveguide structure of claim 7, wherein the sixth waveguide is at a different height than the third waveguide.

9. The waveguide structure of claim 7, wherein the sixth waveguide overlaps the third waveguide.

10. The waveguide structure of claim 7, wherein:

the second material is amorphous silicon, the third material is silicon nitride with an atomic ratio, of silicon to nitrogen, of at least 1.5, the fourth material is silicon nitride, with an atomic ratio, of silicon to nitrogen, between 0.6 and 1.5.

11. The waveguide structure of claim 7, further comprising:

a second intervening layer, between the first waveguide and the second waveguide, the second intervening layer being composed of a sixth material, having a sixth index of refraction.

12. The waveguide structure of claim 11, wherein the sixth material is the same as the fourth material.

13. The waveguide structure of claim 11, wherein:

the fifth index of refraction is greater than the second index of refraction, the third index of refraction is within 50% of the average of the second index of refraction and the fifth index of refraction, and the fourth index of refraction is lower than the second index of refraction and lower than the fifth index of refraction.

* * * * *